(12) United States Patent
Wu et al.

(10) Patent No.: US 11,778,459 B2
(45) Date of Patent: Oct. 3, 2023

(54) SECURE SESSION METHOD AND APPARATUS

(71) Applicant: HUAWEI TECHNOLOGIES CO., LTD., Guangdong (CN)

(72) Inventors: Rong Wu, Shenzhen (CN); Bo Zhang, Shenzhen (CN); Shuaishuai Tan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 218 days.

(21) Appl. No.: 17/171,397

(22) Filed: Feb. 9, 2021

(65) Prior Publication Data
US 2021/0168594 A1 Jun. 3, 2021

Related U.S. Application Data

(63) Continuation of application No. PCT/CN2019/099355, filed on Aug. 6, 2019.

(30) Foreign Application Priority Data

Aug. 10, 2018 (CN) .......................... 201810910224.4

(51) Int. Cl.
*H04W 12/033* (2021.01)
*H04W 76/12* (2018.01)
(Continued)

(52) U.S. Cl.
CPC ..... *H04W 12/033* (2021.01); *H04W 12/0433* (2021.01); *H04W 12/10* (2013.01); *H04W 76/12* (2018.02); *H04W 88/16* (2013.01)

(58) Field of Classification Search
None
See application file for complete search history.

(56) References Cited

U.S. PATENT DOCUMENTS

2011/0311053 A1    12/2011  Escott et al.
2017/0006469 A1*    1/2017  Palanigounder ........ H04L 9/085
(Continued)

FOREIGN PATENT DOCUMENTS

CN    106714153 A    5/2017
CN    107580324 A    1/2018
(Continued)

OTHER PUBLICATIONS

3GPP TS 23.501 V15.1.0 (Mar. 2018), "3rd Generation Partnership Project; Technical Specification Group Services and System Aspects; System Architecture for the 5G System; Stage 2 (Release 15)," Mar. 2018, 201 pages.

(Continued)

*Primary Examiner* — Mazda Sabouri
(74) *Attorney, Agent, or Firm* — Fish & Richardson P.C.

(57) ABSTRACT

This application provides an example secure session method and apparatus. The method includes receiving, by a user plane gateway, a service request message from user equipment UE, where the service request message is used to request to establish a connection between the UE and a service server in a data network. The user plane gateway and the UE separately generate an encryption key and an integrity protection key based on the service request message, and activate encryption protection and/or integrity protection based on the generated encryption key and integrity protection key.

14 Claims, 11 Drawing Sheets

(51) Int. Cl.
*H04W 12/0433* (2021.01)
*H04W 12/10* (2021.01)
*H04W 88/16* (2009.01)

(56) References Cited

U.S. PATENT DOCUMENTS

| | | | |
|---|---|---|---|
| 2018/0007557 A1 | 1/2018 | Lee et al. | |
| 2020/0037165 A1* | 1/2020 | Kunz | H04W 12/106 |
| 2020/0413258 A1* | 12/2020 | Ben Henda | H04W 36/0038 |
| 2021/0120409 A1* | 4/2021 | Nair | H04W 12/04 |

FOREIGN PATENT DOCUMENTS

| | | |
|---|---|---|
| CN | 108347416 A | 7/2018 |
| WO | 2018000936 A1 | 1/2018 |
| WO | 2018110939 A1 | 6/2018 |
| WO | 2018137255 A1 | 8/2018 |
| WO | 2018137334 A1 | 8/2018 |

OTHER PUBLICATIONS

3GPP TS 23.502 V15.1.0 (Mar. 2018), "3rd Generation Partnership Project; Technical Specification Group Services and System Aspects; Procedures for the 5G System; Stage 2 (Release 15)," Mar. 2018, 285 pages.

3GPP TR 23.724 V0.4.0 (Jun. 2018), "3rd Generation Partnership Project; Technical Specification Group Services and System Aspects; Study on Cellular IoT support and evolution for the 5G System (Release 16)," Jun. 2018, 179 pages.

3GPP TS 33.501 V15.1.0 (Jun. 2018), "3rd Generation Partnership Project; Technical Specification Group Services and System Aspects; Security architecture and procedures for 5G system (Release 15)," Jun. 2018, 152 pages.

Ericsson, "PCR 23.724: Infrequent Small Data user plane transmission for CIoT," SA WG2 Meeting #126 S2-183041, Montreal, Canada, Feb. 26-Mar. 2, 2018, 6 pages.

Office Action issued in Chinese Application No. 201810910224.4 dated Jan. 20, 2021, 14 pages.

PCT International Search Report and Written Opinion issued in International Application No. PCT/CN2019/099355 dated Oct. 16, 2019, 17 pages (with English translation).

ZTE, "Update for Solution 5: Small Data Fast Path communication," SA WG2 Meeting #128, S2-186602, Vilnius, Lithuania, Jul. 2-6, 2018, 9 pages.

Qualcomm Incorporated, "UE Capability Related To Integrity Protection Of DRBs For Signalling Of The Maximum Supported Data Rate Per UE For Integrity Protection," 3GPP TSG-WG2 Meeting #127, S2-183139, Sanya, China, Apr. 16-20, 2018, 27 pages.

Office Action in Chinese Appln. No. 201810910224.4, dated Nov. 21, 2022, 6 pages (with English translation).

Extended European Search Report issued in European Application No. 19846015.6 dated Jun. 18, 2021, 8 pages.

Huawei Hisilicon, "Definition and Clarification for Security Policy Control Function," 3GPP TSG SA WG3 (Security) Meeting #85, S3-161987, Santa Cruz de Tenerife, Spain, Nov. 7-11, 2016, 5 pages.

Huawei et al., "PCR of User Plane Security Protection," 3GPP TSG SA WG3 (Security) Meeting #84, S3-161002, Chennai, India, Jul. 25-29, 2016, 12 pages.

* cited by examiner

SECURE SESSION METHOD AND APPARATUS

CROSS-REFERENCE TO RELATED APPLICATIONS

This application is a continuation of International Application No. PCT/CN2019/099355, filed on Aug. 6, 2019, which claims priority to Chinese Patent Application No. 201810910224.4, filed on Aug. 10, 2018. The disclosures of the aforementioned applications are hereby incorporated by reference in their entireties.

TECHNICAL FIELD

This application relates to the wireless communications field, and more specifically, to a secure session method and apparatus.

BACKGROUND

Mobile communication security is increasingly concerned. In a data transmission process, a transmit end may perform encryption protection and integrity protection on to-be-transmitted data, and a receive end may perform decryption and integrity verification on received encrypted data. This can ensure data privacy and integrity.

For example, during uplink transmission, UE may send data to an access network device after completing encryption and integrity protection on the data, and the access network device can perform decryption and integrity verification on the data. After completing the decryption and the integrity verification on the data, the access network device transmits the data through a secure channel between the access network device and a core network device such as a user plane gateway. The core network device completes operations such as IP address allocation and charging, and sends the data to an internet server.

However, because the data is transmitted through the secure channel after being decrypted by the access network device, a specific security risk exists. For example, the data may be tampered with or stolen before being transmitted to the core network through the secure channel. Consequently, security is low.

SUMMARY

This application provides a secure session method and apparatus, to improve data transmission security.

According to a first aspect, a secure session method is provided. The method includes: A user plane gateway receives a service request message from user equipment UE, where the service request message is used to request to establish a connection between the UE and a service server in a data network; the user plane gateway generates an encryption key and an integrity protection key based on the service request message; and the user plane gateway activates encryption protection and/or integrity protection based on the encryption key and the integrity protection key.

According to the foregoing technical solution, user plane security protection is established between the UE and the user plane gateway, to implement end-to-end security protection between the UE and the user plane gateway. This is similar to establishment of an end-to-end secure channel, and the UE and the user plane gateway may securely perform data transmission on the secure channel. Encryption and/or integrity protection are/is performed on data between the UE and the user plane gateway. Therefore, compared with the prior art, this avoids a possibility that data is tampered with or stolen after being decrypted by an access network device, thereby bringing higher security.

It should be noted that a network element that can be configured to implement the foregoing user plane function (UPF) is not limited to the user plane gateway. For example, the network element may alternatively be a network element configured to transmit or route user plane data, such as a serving gateway (SGW), a public data network (PDN) gateway (PDN gateway, PGW), a PDU session anchor session agent, or a local breakout server ((LBO) server).

This embodiment of this application is merely an example, and this embodiment of this application is described in detail by using user plane security protection deployed between the UE and the user plane gateway as an example. The user plane gateway may alternatively be replaced with a PGW and another network element that can be used to implement a same or similar function.

With reference to the first aspect, in some implementations of the first aspect, the method further includes: The user plane gateway determines a first security algorithm based on a security capability of the UE and a security capability of the user plane gateway; and the user plane gateway sends indication information of the first security algorithm to the UE.

In other words, the first security algorithm may be determined by the user plane gateway based on the security capability of the UE and the security capability of the user plane gateway and then notified to the UE. In some cases, the user plane gateway has a relatively strong capability and can support all security algorithms, so that the first security algorithm can be determined based on only the security capability of the UE.

With reference to the first aspect, in some implementations of the first aspect, the method further includes: The user plane gateway determines a first security algorithm based on a security capability of the UE, a security capability of the user plane gateway, and a security requirement of a service; and the user plane gateway sends indication information of the first security algorithm to the UE.

The user plane gateway may further determine the first security algorithm based on the security requirement of the service, to satisfy security requirements of different services.

With reference to the first aspect, in some implementations of the first aspect, the method further includes:

The user plane gateway receives indication information of a first security algorithm from a session management network element, where the first security algorithm is determined based on a security capability of the UE and a security capability of the user plane gateway, or the first security algorithm is determined based on a security capability of the UE, a security capability of the user plane gateway, and a security requirement of a service.

In other words, the first security algorithm may alternatively be determined by the session management network element and then notified to the user plane gateway.

With reference to the first aspect, in some implementations of the first aspect, that the user plane gateway generates an encryption key and an integrity protection key based on the service request message includes: The user plane gateway receives a user plane function (UPF) transmission root key from an access and mobility management network element; and the user plane gateway generates the encryption key and the integrity protection key based on the service request message and the UPF transmission root key.

The user plane gateway may generate the encryption key and the integrity protection key based on the service request message and the UPF transmission root key. The encryption key may be used for data encryption/decryption, and the integrity protection key may be used for data integrity protection and verification.

With reference to the first aspect, in some implementations of the first aspect, the method further includes: The user plane gateway sends first security activation indication information to the access network device, where the first security activation indication information is used to indicate not to activate user plane security protection of the access network device.

The user plane gateway may indicate the access network device not to activate the user plane security protection, so that the access network device can determine that a termination point for the user plane security protection is not the access network device, in other words, the user plane security protection of the access network device is not enabled.

With reference to the first aspect, in some implementations of the first aspect, the method further includes: The user plane gateway receives a key identifier from the access and mobility management network element, where the key identifier includes a key set identifier KSI corresponding to the UPF transmission root key and/or a key set identifier in 5G ngKSI corresponding to an intermediate key, and the intermediate key is a key used to generate the UPF transmission root key.

The key identifier may be used to identify the UPF transmission root key. When the UPF transmission root key changes, the access and mobility management network element may send a new key identifier to notify the user plane gateway, so that the user plane gateway determines a new UPF transmission root key based on the new key identifier, to determine a new encryption key and integrity protection key.

With reference to the first aspect, in some implementations of the first aspect, the method further includes: The user plane gateway transmits a data packet to the UE, where the data packet carries the key identifier, the key identifier includes the key set identifier KSI corresponding to the UPF transmission root key and/or the key set identifier in 5G ngKSI corresponding to the intermediate key, and the intermediate key is a key used to generate the UPF transmission root key.

The UE and the user plane gateway may separately store a plurality of encryption keys and integrity protection keys. When the key identifier is carried in the data packet exchanged between the UE and the user plane gateway, the UE and the user plane gateway each may obtain a corresponding key based on the key identifier to perform encryption/decryption and/or integrity protection.

According to a second aspect, a secure session method is provided. The method includes: A session management network element receives a service request message from user equipment UE, where the service request message is used to request to establish a connection between the UE and a service server in a data network; the session management network element generates an encryption key and an integrity protection key based on the service request message; and the session management network element sends the encryption key and the integrity protection key to a user plane gateway.

According to the foregoing technical solution, the session management network element may generate the encryption key and the integrity protection key based on the service request message, and notify the user plane gateway of the encryption key and the integrity protection key. Therefore, user plane security protection can be established between the UE and the user plane gateway, to implement end-to-end security protection between the UE and the user plane gateway. This is similar to establishment of an end-to-end secure channel, and the UE and the user plane gateway may securely perform data transmission on the secure channel. Encryption and/or integrity protection are/is performed on data between the UE and the user plane gateway. Therefore, compared with the prior art, this avoids a possibility that data is tampered with or stolen after being decrypted by an access network device, thereby bringing higher security.

With reference to the second aspect, in some implementations of the second aspect, the method further includes: The session management network element determines a first security algorithm based on a security capability of the UE and a security capability of the user plane gateway; the session management network element sends indication information of the first security algorithm to the UE; and the session management network element sends the indication information of the first security algorithm to the user plane gateway.

In other words, the first security algorithm may be determined by the session management network element and then notified to the user plane gateway, or the first security algorithm may be determined by the user plane gateway based on the security capability of the UE and the security capability of the user plane gateway and then notified to the UE and the user plane gateway. In some cases, the user plane gateway has a relatively strong capability and can support all security algorithms, so that the user plane gateway can determine the first security algorithm based on only the security capability of the UE.

With reference to the second aspect, in some implementations of the second aspect, the method further includes: The session management network element determines a first security algorithm based on a security capability of the UE, a security capability of the user plane gateway, and a security requirement of a service; the session management network element sends indication information of the first security algorithm to the UE; and the session management network element sends the indication information of the first security algorithm to the user plane gateway.

The session management network element may further determine the first security algorithm based on the security requirement of the service, to satisfy security requirements of different services.

With reference to the second aspect, in some implementations of the second aspect, that the session management network element generates an encryption key and an integrity protection key based on the service request message includes: The session management network element receives a user plane function UPF transmission root key from an access and mobility management network element; and the session management network element generates the encryption key and the integrity protection key based on the service request message and the UPF transmission root key.

The session management network element may generate the encryption key and the integrity protection key based on the service request message and the UPF transmission root key. The encryption key may be used for data encryption/decryption, and the integrity protection key may be used for data integrity protection and verification.

With reference to the second aspect, in some implementations of the second aspect, the method further includes: The session management network element sends first security activation indication information to the access network device, where the first security activation indication information is used to indicate not to activate user plane security protection of the access network device.

The session management network element may indicate the access network device not to activate the user plane security protection, so that the access network device can determine that a termination point for the user plane security protection is not the access network device, in other words, the user plane security protection of the access network device is not enabled.

With reference to the second aspect, in some implementations of the second aspect, the method further includes: The session management network element receives a key identifier from the access and mobility management network element, where the key identifier includes a key set identifier KSI corresponding to the UPF transmission root key and/or a key set identifier in 5G ngKSI corresponding to an intermediate key, and the intermediate key is a key used to generate the UPF transmission root key; and the session management network element sends the key identifier to the user plane gateway.

The key identifier may be used to identify the UPF transmission root key. When the UPF transmission root key changes, the access and mobility management network element may send a new key identifier to notify the user plane gateway, so that the user plane gateway determines a new UPF transmission root key based on the new key identifier, to determine a new encryption key and integrity protection key.

According to a third aspect, a secure session method is provided. The method includes: UE sends a service request message, where the service request message is used to request to establish a connection between the UE and a service server in a data network; the UE generates an encryption key and an integrity protection key based on the service request message; and the UE activates encryption protection and/or integrity protection based on the encryption key and the integrity protection key.

According to the foregoing technical solution, the UE sends the service request message to request to establish the connection between the UE and the service server in the data network. The connection may be used for data transmission between the UE and a user plane gateway. Based on the service request, the UE and a network side may separately generate an encryption key and an integrity protection key, and activate user plane security protection. Therefore, user plane security protection can be established between the UE and the user plane gateway, to implement end-to-end security protection between the UE and the user plane gateway. This is similar to establishment of an end-to-end secure channel, and the UE and the user plane gateway may securely perform data transmission on the secure channel. Encryption and/or integrity protection are/is performed on data between the UE and the user plane gateway. Therefore, compared with the prior art, this avoids a possibility that data is tampered with or stolen after being decrypted by an access network device, thereby bringing higher security.

With reference to the third aspect, in some implementations of the third aspect, the method further includes: the UE receives indication information of a first security algorithm, where the first security algorithm is determined based on a security capability of the UE and a security capability of the user plane gateway.

The first security algorithm may be determined by any one of the user plane gateway, a session management network element, or an access and mobility management network element and then notified to the UE. The first security algorithm is determined based on at least the security capability of the UE and the security capability of the user plane gateway. In some cases, the user plane gateway has a relatively strong capability and can support all security algorithms, so that the first security algorithm can be determined based on only the security capability of the UE.

With reference to the third aspect, in some implementations of the third aspect, the method further includes: The UE receives indication information of a first security algorithm, where the first security algorithm is determined based on a security capability of the UE, a security capability of the user plane gateway, and a security requirement of a service.

The first security algorithm may be further determined based on the security requirement of the service, to satisfy security requirements of different services.

With reference to the third aspect, in some implementations of the third aspect, the method further includes: The UE receives second security activation indication information from the access network device, where the second security activation indication information is used to indicate to activate user plane security protection of the UE.

The second security activation indication information may be sent by the access network device to the UE based on received first security activation indication information. The second security activation indication information is used to indicate the UE to activate user plane security protection between the UE and the user plane gateway, but not to activate user plane security protection between the UE and the access network device.

Based on the second security activation indication information, the UE may determine whether the user plane security protection between the UE and the user plane gateway or the user plane security protection between the UE and the access network device is activated.

It should be understood that the second security activation indication information may be the same as or may be different from the first security activation indication information. This is not limited in this application.

With reference to the third aspect, in some implementations of the third aspect, the method further includes: The UE receives an input parameter from an access and mobility management network element; and the UE generates a user plane function UPF transmission root key based on the input parameter, where the UPF transmission root key is used to generate the encryption key and the integrity protection key.

The UE may generate the UPF transmission root key based on the input parameter sent by the access and mobility management network element, to generate the encryption key and the integrity protection key. It should be understood that the input parameter may be obtained by the access and mobility management network element and then notified to the UE, or may be carried in the service request message sent by the UE, for example, a PDU session identifier. This is not limited in this application.

With reference to the third aspect, in some implementations of the third aspect, the method further includes: The UE receives a key identifier from the access and mobility management network element, where the key identifier includes a key set identifier KSI corresponding to the UPF transmission root key and/or a key set identifier in 5G ngKSI corresponding to an intermediate key, and the intermediate key is a key used to generate the root key.

The key identifier may be used to identify the UPF transmission root key. When the UPF transmission root key changes, the access and mobility management network element may send a new key identifier to notify the UE, so that the UE determines a new UPF transmission root key based on the new key identifier, to determine a new encryption key and integrity protection key.

With reference to the third aspect, in some implementations of the third aspect, the method further includes: The UE transmits a data packet to the user plane gateway, where the data packet carries the key identifier, the key identifier includes the key set identifier KSI corresponding to the UPF transmission root key and/or the key set identifier in 5G ngKSI corresponding to the intermediate key, and the intermediate key is a key used to generate the UPF transmission root key.

The UE and the user plane gateway may separately store a plurality of encryption keys and integrity protection keys. When the key identifier is carried in the data packet exchanged between the UE and the user plane gateway, the UE and the user plane gateway each may obtain a corresponding key based on the key identifier to perform encryption/decryption and/or integrity protection.

According to a fourth aspect, a secure session method is provided. The method includes: an access and mobility management network element receives a service request message from UE, where the service request message is used to request to establish a connection between the UE and a service server in a data network, the access and mobility management network element generates a UPF transmission root key based on the service request message, where the UPF transmission root key is used to generate an encryption key and an integrity protection key; and the access and mobility management network element sends the UPF transmission root key to a user plane gateway or a session management network element.

According to the foregoing technical solution, the access and mobility management network element may generate the encryption key and the integrity protection key based on the service request message, and notify the user plane gateway of the encryption key and the integrity protection key. Therefore, user plane security protection can be established between the UE and the user plane gateway, to implement end-to-end security protection between the UE and the user plane gateway. This is similar to establishment of an end-to-end secure channel, and the UE and the user plane gateway may securely perform data transmission on the secure channel. Encryption and/or integrity protection are/is performed on data between the UE and the user plane gateway. Therefore, compared with the prior art, this avoids a possibility that data is tampered with or stolen after being decrypted by an access network device, thereby bringing higher security.

With reference to the fourth aspect, in some implementations of the fourth aspect, the method further includes: The access and mobility management network element sends first security activation indication information to the access network device, where the first security activation indication information is used to indicate not to activate user plane security protection of the access network device.

The access and mobility management network element may indicate the access network device not to activate the user plane security protection, so that the access network device can determine that a termination point for the user plane security protection is not the access network device, in other words, the user plane security protection of the access network device is not enabled.

With reference to the fourth aspect, in some implementations of the fourth aspect, the method further includes: The access and mobility management network element sends an input parameter used to obtain the UPF transmission root key to the UE.

The UE may generate the UPF transmission root key based on the input parameter sent by the access and mobility management network element, to generate the encryption key and the integrity protection key. It should be understood that the input parameter may be obtained by the access and mobility management network element and then notified to the UE, or may be carried in the service request message sent by the UE, for example, a PDU session identifier. This is not limited in this application.

With reference to the fourth aspect, in some implementations of the fourth aspect, the method further includes: The access and mobility management network element sends a key identifier, where the key identifier includes a key set identifier KSI corresponding to the UPF transmission root key and/or an ngKSI corresponding to an intermediate key, and the intermediate key is a key used to generate the root key.

The key identifier may be used to identify the UPF transmission root key. When the UPF transmission root key changes, the access and mobility management network element may send a new key identifier to notify the UE and the user plane gateway, so that the UE and the user plane gateway may separately determine a new UPF transmission root key based on the new key identifier, to determine a new encryption key and integrity protection key.

According to a fifth aspect, a secure session apparatus is provided, including modules or units configured to perform the method according to any possible implementation of the first aspect to the fourth aspect.

According to a sixth aspect, a secure session device is provided, including a processor. The processor is coupled to a memory, and may be configured to execute an instruction in the memory, to implement the method according to any possible implementation of the first aspect to the fourth aspect. Optionally, the secure session device further includes the memory. Optionally, the secure session device further includes a communications interface, and the processor is coupled to the communications interface.

In an implementation, the secure session device is a communications device, for example, the UE, the user plane gateway, the session management network element, or the access and mobility management network element in the embodiments of this application. When the secure session device is a communications device, the communications interface may be a transceiver or an input/output interface.

In another implementation, the secure session device is a chip configured in a communications device, for example, a chip configured in the UE, the user plane gateway, the session management network element, or the access and mobility management network element in the embodiments of this application. When the secure session device is a chip configured in a communications device, the communications interface may be an input/output interface.

Optionally, the transceiver may be a transceiver circuit. Optionally, the input/output interface may be an input/output circuit.

According to a seventh aspect, a processor is provided, including an input circuit, an output circuit, and a processing circuit. The processing circuit is configured to: receive a signal by using the input circuit, and transmit a signal by using the output circuit, so that the processor is enabled to perform the method according to any possible implementation of the first aspect to the fourth aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, a receiver or the like, and a signal that is output by the output circuit may be output to, for example, a transmitter or the like and transmitted by the transmitter. In addition, the input circuit and the output circuit may be a same circuit, and the circuit is used as the input circuit and the output circuit at different moments. Specific implementations of the processor and the various circuits are not limited in this embodiment of this application.

According to an eighth aspect, a processing apparatus is provided, including a processor and a memory. The processor is configured to: read an instruction stored in the memory, receive a signal by using a receiver, and transmit a signal by using a transmitter, to perform the method according to any possible implementation of the first aspect to the fourth aspect.

Optionally, there are one or more processors and one or more memories.

Optionally, the memory may be integrated with the processor, or the memory and the processor are separately disposed.

In a specific implementation process, the memory may be a non-transitory memory, for example, a read-only memory (ROM). The memory and the processor may be integrated on a same chip, or may be disposed on different chips. A type of the memory and a manner of disposing the memory and the processor are not limited in this embodiment of this application.

It should be understood that, for a related data exchange process, for example, an indication information sending process may be a process of outputting indication information from the processor, and a capability information receiving process may be a process of receiving input capability information by the processor. Specifically, data that is output by the processor may be output to the transmitter, and input data received by the processor may be from the receiver. The transmitter and the receiver may be collectively referred to as a transceiver.

The processing apparatus according to the eighth aspect may be a chip. The processor may be implemented by using hardware, or may be implemented by using software. When the processor is implemented by using the hardware, the processor may be a logic circuit, an integrated circuit, or the like; or when the processor is implemented by using the software, the processor may be a general purpose processor, and is implemented by reading software code stored in the memory. The memory may be integrated into the processor, or may be located outside the processor, or may exist independently.

According to a ninth aspect, a computer program product is provided. The computer program product includes a computer program (which may also be referred to as code or an instruction). When the computer program is run, a computer is enabled to perform the method according to any possible implementation of the first aspect to the fourth aspect.

According to a tenth aspect, a computer-readable medium is provided. The computer-readable medium stores a computer program (which may also be referred to as code or an instruction). When the computer program is run on a computer, the computer is enabled to perform the method according to any possible implementation of the first aspect to the fourth aspect.

According to an eleventh aspect, a communications system is provided, including the UE, the user plane gateway, the session management network element, the access and mobility management network element, and the access network device described above.

DESCRIPTION OF EMBODIMENTS

The following describes technical solutions of this application with reference to accompanying drawings.

The technical solutions of the embodiments of this application may be applied to various communications systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex TDD), a universal mobile telecommunications system (UMTS), a worldwide interoperability for microwave access (WiMAX) communications system, a future 5th generation (5G) system, or a new radio (NR) system.

In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the method provided in the embodiments of this application may be performed by a terminal or a network device, or a functional module that can invoke a program in UE or the network device and execute the program.

For ease of understanding of the embodiments of this application, an application scenario of the embodiments of this application is first described in detail with reference to FIG. 1.

Figure 1:
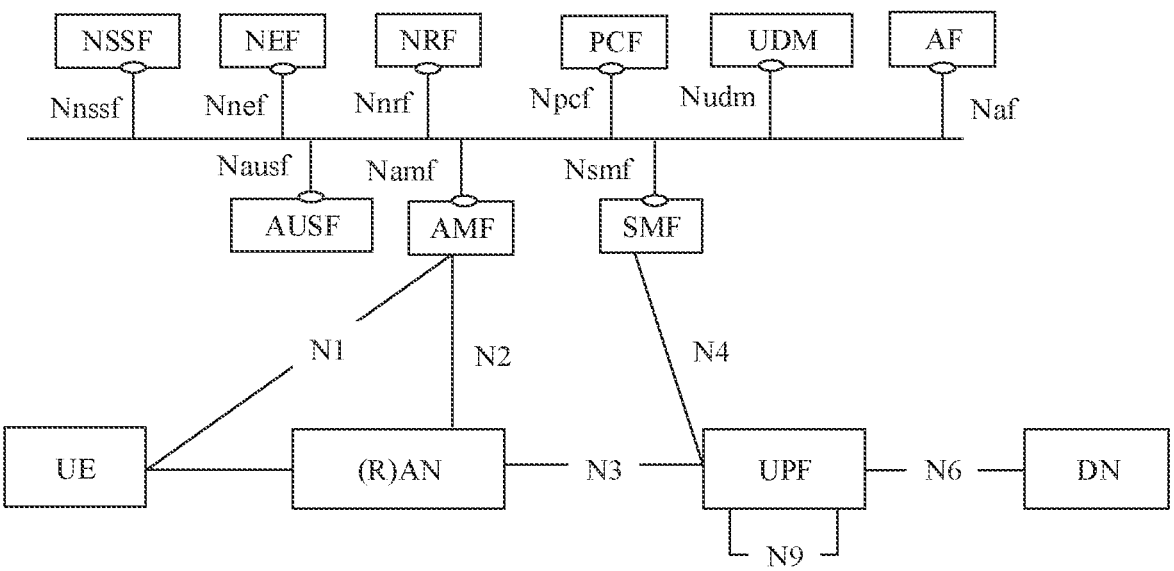
FIG. 1 is a schematic diagram of a network architecture to which a method according to an embodiment of this application is applicable.

FIG. 1 is a schematic diagram of a network architecture to which a method according to an embodiment of this application is applicable. As shown in the figure, the network architecture may be, for example, a non-roaming architecture. The network architecture may specifically include the following network elements:

1. User equipment (UE): The UE may be referred to as a terminal device, a terminal, an access terminal, a subscriber unit, a subscriber station, a mobile station, a mobile console, a remote station, a remote terminal, a mobile device, a user terminal, a wireless communications device, a user agent, or a user apparatus. The UE may alternatively be a cellular phone, a cordless telephone set, a session initiation protocol (SIP) phone, a wireless local loop (WLL) station, a personal digital assistant (PDA), a handheld device with a wireless communication function, a computing device, another processing device connected to a wireless modem, a vehicle-mounted device, a wearable device, a terminal device in a future 5G network, a terminal device in a future evolved public land mobile network (PLMN), or the like. The UE may alternatively be an end device, a logical entity, an intelligent device, for example, a terminal device such as a mobile phone or a smart terminal, a communications device such as a server, a gateway, a base station, or a controller, or an internet of things (IoT) device such as a sensor, an electricity meter, or a water meter. This is not limited in the embodiments of this application.

In the embodiments of this application, the UE stores a long term key. When performing two-way authentication with a core network element (for example, an AMF entity or an AUSF entity described below), the UE performs verification on network authenticity by using the long term key and a related function, to ensure data transmission security.

2. Access network (AN): The access network provides a network access function for an authorized user in a specific area, and can use transmission tunnels with different quality based on user levels, service requirements, and the like. The access network may be an access network using different access technologies. Currently, there are two types of radio access technologies: a 3rd generation partnership project (3GPP) access technology (for example, a radio access technology used in a 3G, 4G, or 5G system) and a non-3rd generation partnership project (non-3GPP) access technology. The 3GPP access technology is an access technology that complies with 3GPP standard specifications. An access network using the 3GPP access technology is referred to as a radio access network (RAN), and an access network device in the 5G system is referred to as a next generation node base station (gNB). The non-3GPP access technology is an access technology that does not comply with the 3GPP standard specifications, for example, an air interface technology represented by a WiFi access point (AP).

An access network that implements a network access function based on a wireless communications technology may be referred to as a radio access network (RAN). The radio access network can manage radio resources, provide an access service for a terminal, and further complete forwarding of a control signal and user data between the terminal and a core network.

The radio access network may be, for example, a NodeB, an evolved NodeB (eNB or eNodeB), a next generation NodeB (gNB) in the 5G mobile communications system, a base station in a future mobile communications system, or an AP in a WiFi system. Alternatively, the access network device may be a radio controller in a cloud radio access network (CRAN) scenario, or the access network device may be a relay station, an access point, a vehicle-mounted device, a wearable device, a network device in the future 5G network, a network device in the future evolved PLMN network, or the like. A specific technology and a specific device form used by the radio access network device are not limited in the embodiments of this application.

3. Access and mobility management function (AMF) entity: The AMF entity is mainly configured to perform mobility management, access management, and the like, and may be configured to implement functions of a mobility management entity (MME) except a session management function, for example, a lawful interception function or an access authorization (or authentication) function. In the embodiments of this application, the AMF entity may be configured to implement functions of an access and mobility management network element.

4. Session management function (SMF) entity: The SMF entity is mainly configured to perform session management, UE internet protocol (IP) address allocation and management, selection of a manageable user plane function, policy control, charging of a function interface termination point, downlink data notification, and the like. In the embodiments of this application, the SMF entity may be configured to implement functions of a session management network element.

5. User plane function (UPF) entity: The UPF entity is a data plane gateway, and may be configured to: perform packet routing and forwarding, quality of service (QoS) handling for user plane data, and the like. The user data may be accessed to a data network (DN) by using the network element. In the embodiments of this application, the UPF entity may be configured to implement functions of a user plane gateway.

6. Data network (DN): The data network is a network that provides data transmission, for example, an operator service network, the internet, or a third-party service network.

7. Authentication server function (AUSF) entity: The AUSF entity is mainly configured to perform user authentication and the like.

8. Network exposure function (NEF) entity: The NEF entity is configured to securely expose services and capabilities provided by 3GPP network functions to the outside, and the like.

9. Network repository function (network function (NF) repository function, NRF) entity: The NRF entity is configured to: store description information of a network function entity and description information of a service provided by the network function entity, support service discovery and network element entity discovery, and the like.

10. Policy control function (PCF) entity: The PCF entity is configured to: support a unified policy framework that governs network behavior, provide policy rule information for a control plane function network element (for example, the AMF network element or the SMF network element), and the like.

11. Unified data management (UDM) entity: The UDM entity is configured to perform user identification handling, access authentication, registration, mobility management, and the like.

12. Application function (AF) entity: The AF entity is configured to: perform application data routing, access a network exposure function network element, interact with a policy framework to perform policy control, and the like.

In the network architecture, an N1 interface is a reference point between the terminal and the AMF entity; an N2 interface is a reference point between the AN entity and the AMF entity, and is configured to send a non-access stratum (NAS) message and the like; an N3 interface is a reference point between the (R)AN entity and the UPF entity, and is configured to transmit user plane data and the like; an N4 interface is a reference point between the SMF entity and the UPF entity, and is configured to transmit information such as N3 connection tunnel identifier information, data buffer indication information, and a downlink data notification message; and an N6 interface is a reference point between the UPF entity and the DN network element, and is configured to transmit user plane data and the like.

It should be understood that the foregoing network architecture applied to the embodiments of this application is merely an example of a network architecture described from a perspective of a conventional point-to-point architecture and a service architecture, and a network architecture applicable to the embodiments of this application is not limited thereto. Any network architecture that can implement the functions of the foregoing network elements is applicable to the embodiments of this application.

It should be further understood that the AMF entity, the SMF entity, the UPF entity, the NSSF entity, the NEF entity, the AUSF entity, the NRF entity, the PCF entity, and the UDM entity shown in FIG. 1 may be understood as network elements configured to implement different functions in the core network, for example, may be combined into a network slice based on a requirement. These core network elements may be independent devices, or may be integrated into a same device to implement different functions. This is not limited in this application.

In the following descriptions, for ease of description, an entity configured to implement an AMF is denoted as an access and mobility management network element, an entity configured to implement an SMF is denoted as a session management network element, an entity configured to implement a UPF is denoted as a user plane gateway, an entity configured to implement a UDM function is denoted as a unified data management network element, and an entity configured to implement a PCF is denoted as a policy control network element. It should be understood that the foregoing names are merely used to distinguish between different functions, and do not indicate that these network elements are independent physical devices. A specific form of the foregoing network elements is not limited in this application. For example, the foregoing network elements may be integrated into a same physical device, or may be different physical devices. In addition, the foregoing names are merely used to distinguish between different functions, and should not constitute any limitation on this application. This application does not exclude a possibility of using another name in the 5G network and another future network. For example, in a 6G network, some or all of the foregoing network elements may use terms in 5G, or may use other names. Unified descriptions are provided herein, and details are not described below again.

It should be further understood that names of interfaces between the foregoing network elements in FIG. 1 are only examples, and the interfaces may have other names during specific implementation. This is not specifically limited in this application. In addition, names of messages (or signaling) transmitted between the foregoing network elements are merely examples, and do not constitute any limitation on functions of the messages.

Figure 2:
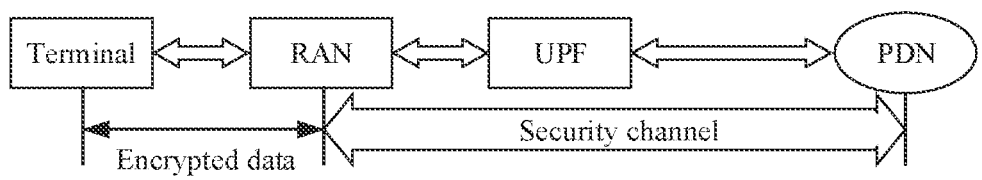
FIG. 2 is a schematic diagram of a small data fast path (sSDFP) transmission solution.

FIG. 2 is a schematic diagram of small data transmission. Specifically. FIG. 2 is a schematic diagram of a small data fast path (SDFP) transmission solution. Small data may be fast transmitted through the N3 interface and the N6 interface on a dedicated channel: terminal→access network→user plane gateway.

However, in a current technology, small data is transmitted to an access network device after encryption and integrity protection are performed on the small data on a terminal side. After performing decryption and integrity verification on the encrypted data, the access network device may transmit the data to a user plane gateway through a secure channel. The small data transmitted to the user plane gateway is routed and forwarded to a public data network (PDN) by the user plane gateway.

In a process of transmitting small data, the access network device is usually responsible for performing decryption and integrity verification on the small data, and the user plane gateway is responsible for routing and distributing the small data. Therefore, in the process of transmitting the small data from the access network to the user plane gateway, there is a risk at which the small data is tampered with. Consequently, security is low. After completing the decryption and integrity verification on the small data, the access network device transmits the data through a secure channel between the access network device and a core network device such as the user plane gateway.

However, because the small data is transmitted through the secure channel after being decrypted by the access network device, a specific security risk exists. For example, the data may be tampered with or stolen before being transmitted to the core network through the secure channel. Consequently, security is low.

In view of this, this application provides a method, to implement user plane security protection between UE and a user plane gateway, thereby improving data transmission security. It should be understood that the method provided in this application is not limited to SDFP transmission and small data transmission. The method provided in this embodiment of this application is applicable to all scenarios in which data transmission is performed between the UE and the user plane gateway and the user plane gateway is used as a security termination point for user data transmission, for example, which includes but is not limited to an enhanced mobile broadband (eMBB) service, an ultra-reliable low-latency communication (URLLC) service, and an IoT service.

For ease of understanding, before the embodiments of this application are described, several terms in this application are first briefly described.

1. Small data: Small data transmission is mainly applied to a cellular internet of things (CIoT), and may be applied to a terminal with low complexity, limited energy, and a low transmission rate. In some scenarios, the terminal may have low mobility, for example, an internet of things device such as a diastimeter, a water meter, an electricity meter, or a sensor.

2. Authentication and key agreement (AKA): In a process of initiating registration during power-on, a user may perform AKA with a network. The AKA can implement two-way authentication between a terminal and a network end, so that a key of the terminal is consistent with that of the network end. In this way, secure communication between the terminal and the network can be ensured.

3. First intermediate key KAMF: The KAMF is a key separately obtained by the UE and an AMF in a UE registration process. The KAMF is related to a key set identifier in 5G (KSI in 5G, ngKSI). For example, the UE and the AMF may separately pre-store a one-to-one correspondence between at least one KAMF and at least one ngKSI. Therefore, each ngKSI may be used to uniquely indicate one KAMF. The KAMF may be used to subsequently generate a UPF transmission root key KUPF.

4. Second intermediate key KSMF: The KSMF is a key derived from the KAMF. For example, the KSMF may be generated based on the KAMF and an algorithm such as a key derivation function (KDF), which may be specifically shown in the following formula:

KSMF=KDF(KAMF, another parameter). The another parameter may also be referred to as an input parameter, for example, may include at least one of a session identifier, a slice identifier, a session type, a fresh parameter, and an SMF identifier. The KSMF may also be used to subsequently generate the UPF transmission root key KUPF.

5. UPF transmission root key KUPF: The KUPF is a root key used for data transmission between the UE and a UPF. Specifically, the root key may be used to subsequently generate an encryption key and an integrity protection key, and the encryption key and the integrity protection key may be used for data transmission between the UE and the UPF. The KUPF may be generated based on the KAMF or the KSMF. For example, the KUPF may be generated based on the KAMF (or the KSMF) and a key derivation function (KDF), which may be specifically shown in the following formula:

KUPF=KDF(KAMF, another parameter). The another parameter may include, for example, at least one of a UPF identifier, a session identifier (session ID), a network identifier, a character string, and a fresh parameter.

Various parameters used to generate the second intermediate key KSMF or the UPF transmission root key KUPF include the following specific content:

The fresh parameter may include, for example, but is not limited to an arbitrary or a non-repeated number once (Nonce), a random number, a counter, a NAS uplink (UL)/downlink (DL) counter (NAS UL/DL counter), and a next hop (NH) timestamp.

The UPF identifier may include, for example, but is not limited to a UPF identity (ID), a UPF index, a UPF downlink/uplink tunnel identifier (UPF DL/UL tunnel endpoint (TE) ID), or a UPF count value. The UPF count value may be used to indicate a UPF sequence number.

The SMF identifier may include, for example, but is not limited to an SMF ID, an SMF index, an SMF MAC address, and an identifier or a count value that is connected to the SMF and that may be used for SMF distinguishing. The SMF count value may be used to indicate an SMF sequence number. For example, if identifiers are an SMF 1 and an SMF 2, count values may be 1, 2, or 3. The session identifier may include, for example, but is not limited to a packet data unit (PDU) session ID (PDU session ID), and a service ID or a service type corresponding to a session.

The network identifier may include, for example, but is not limited to an operator identifier (for example, a public land mobile network (PLMN) ID), an access network identifier (access network ID), a serving network identity (serving network ID), a cell identifier (cell ID), a base station identifier (gNB ID), a local area network ID, a slice ID, a bearer ID, a quality of service (QoS) ID, a flow ID, and network slice selection assistance information (NSSA).

The character string may be a character indicating an application scenario of the key. For example, the character string may include but is not limited to "SD", "SDFP", "small data", "CIoT", and the like.

It should be understood that the foregoing enumerated parameters are merely examples, and should not constitute any limitation on this application. This application imposes no limitation on specific content of the UPF identifier, the session identifier, the network identifier, the character string, and the fresh parameter. In addition, this application does not exclude a possibility that other information is used as a parameter used to generate the root key.

It should be further understood that names of the intermediate key and the root key enumerated above are merely for ease of distinguishing, and should not constitute any limitation on this application. This application does not exclude a possibility of replacing the intermediate key or the root key with another name to implement a same or similar function.

6. Encryption key: The encryption key is a parameter that is input when a transmit end encrypts a plaintext based on an encryption algorithm to generate a ciphertext. If a symmetric encryption method is used, the encryption key is the same as a decryption key. A receive end may decrypt the ciphertext based on the same encryption algorithm and encryption key. In other words, the transmit end and the receive end may perform encryption and decryption based on a same key.

In the embodiments, the encryption key may be referred to as KUPFenc for short. The encryption key KUPFenc may be generated based on the UPF transmission root key KUPF and a key generation algorithm such as the KDF, which may be specifically shown in the following formula:

KUPFenc=KDF(KUPF, another parameter). The another parameter may be a character string, for example, "SD", "SDFP", "small data", or "CIoT". Alternatively, the another parameter may be an encryption algorithm type, a length of the encryption algorithm type, an encryption algorithm identifier, a length of the encryption algorithm identifier, or the parameter mentioned above. For example, KUPFenc=KDF(KUPF, "SD", encryption algorithm type).

7. Integrity protection key: The integrity protection key is a parameter that is input when the transmit end performs integrity protection on a plaintext or a ciphertext based on an integrity protection algorithm. The receive end may perform, based on the same integrity protection algorithm and integrity protection key, integrity verification on the data on which integrity protection is performed.

In the embodiments, the integrity protection key may be referred to as KUPFint for short. The integrity protection key KUPFint may be generated based on the UPF transmission root key KUPF and a key generation algorithm such as the KDF, which may be specifically shown in the following formula:

KUPFint=KDF(KUPF, another parameter). The another parameter may be a character string, for example, "SD", "SDFP", "small data", or "CIoT". Alternatively, the another parameter may be an integrity protection algorithm type, a length of the integrity protection algorithm type, an integrity protection algorithm identifier, a length of the integrity protection algorithm identifier, or the parameter mentioned above. For example, KUPFint=KDF(KUPF, "SD", integrity protection algorithm type).

8. Security capability: The security capability includes but is not limited to a security algorithm, a security parameter, a key, and the like. In the embodiments of this application, the security capability may include, for example, a security capability of the UE and a security capability of the user plane gateway.

9. Security algorithm: The security algorithm is an algorithm used for data security protection. For example, the security algorithm may include an encryption/decryption algorithm and an integrity protection algorithm.

10. Security context: The security context is information that can be used to implement data encryption/decryption and/or integrity protection. The security context may include, for example, an encryption/decryption key, an integrity protection key, a fresh parameter (for example, a NAS count), an ngKSI, and a security algorithm.

11. Termination point: A termination point in the embodiments of this application is a termination point for user plane security protection, or is referred to as a termination point for user plane security, a security termination point, or the like. In the embodiments, user plane security is established between the UE and the user plane gateway. Therefore, the termination points of the user plane security protection are the UE and the user plane gateway. As the termination points of the user plane security protection, the UE and the user plane gateway may be responsible for data encryption/decryption and/or integrity protection.

12. User plane security protection activation: In the embodiments, user plane security protection activation includes encryption/decryption protection activation and/or integrity protection/verification activation, to be specific, may include one of the following three cases: only encryption/decryption protection activation, only integrity protection/verification activation, and encryption/decryption protection activation and integrity protection/verification activation. In the following embodiments, "whether to activate encryption protection and/or integrity protection" may include one of the following three cases: whether to activate only encryption/decryption protection, whether to activate only integrity protection/verification, and whether to activate encryption/decryption protection and integrity protection/verification.

It may be understood that, in the embodiments of this application, for downlink transmission, the user plane gateway may be an encryption end, and user plane security protection activation may include encryption protection activation; the UE may be a decryption end, and user plane security protection activation may include decryption protection activation; the user plane gateway may be an integrity protection end, and user plane security protection activation may include integrity protection activation; and the UE may be an integrity verification end, and user plane security protection activation may include integrity verification activation. For uplink transmission, the UE may be an encryption end, and user plane security protection activation may include encryption protection activation; the user plane gateway may be a decryption end, and user plane security protection activation may include decryption protection activation; the UE may be an integrity protection end, and user plane security protection activation may include integrity protection activation; and the user plane gateway may be an integrity verification end, and user plane security protection activation may include integrity verification activation.

Therefore, during data transmission, the UE may serve as both an encryption end and a decryption end or may serve as both an integrity protection end and an integrity verification end, and the user plane gateway may serve as both an encryption end and a decryption end or may serve as both an integrity protection end and an integrity verification end. For encryption/decryption protection activation, both the UE and the user plane gateway can activate encryption protection and decryption protection. For integrity protection/verification activation, both the UE and the user plane gateway can activate integrity protection and integrity verification.

Therefore, in the following descriptions, unless otherwise specified, "encryption protection activation" and "encryption/decryption protection activation" have a same meaning, in other words, are interchangeable, and "integrity protection activation" and "integrity protection/verification activation" have a same meaning, in other words, are interchangeable.

It should be noted that activating user plane security protection may be understood as enabling a security protection function. For example, activating encryption/decryption protection is enabling an encryption/decryption function. On the contrary, skipping activating encryption/decryption protection is skipping enabling an encryption/decryption function. However, it should be understood that, if encryption/decryption protection is not activated, it does not mean that no encryption key or decryption key is generated, and does not mean that no encryption algorithm is obtained through negotiation. In the embodiments, a termination point for the user plane security may pre-obtain an encryption/decryption key and an integrity protection key, and may pre-obtain an encryption/decryption algorithm and an integrity protection algorithm through negotiation. When specific security protection is determined to be activated, corresponding security protection may be directly enabled. For example, when encryption/decryption protection is activated, encryption protection may be directly performed based on an encryption algorithm and an encryption key, or data decryption may be directly performed based on a decryption algorithm and a decryption key.

13. Security policy: In the embodiments, there are a plurality of security policies, including, for example, a user plane security policy in subscription information of the UE, a first security policy generated by a session management network element, and a second security policy generated by the user plane gateway. The security policy may be at least used to indicate whether to activate encryption protection and/or integrity protection. In an implementation, the security policy may indicate a preference for security protection, for example, may indicate required, preferred, and not needed security protection. Whether to activate encryption protection and/or integrity protection may be determined based on the preference for security protection.

Optionally, the security policy may be further used to indicate a termination point for user plane security or a preference suggestion for the termination point for the user plane security. Each security policy may further indicate other more information, for example, a strength suggestion for a security algorithm. Specific content of each security policy is described by using an example in the following embodiments. Detailed descriptions of content included in each security policy are temporarily omitted herein.

The following describes in detail secure session methods provided in the embodiment of this application with reference to the accompanying drawings.

It should be noted that, in the following process of describing the embodiments with reference to the accompanying drawings, the figures are merely used for ease of understanding, and should not constitute any limitation on this application. In addition, the RAN shown in the figure may correspond to an access network device, the AMF may correspond to an access and mobility management network element, the SMF may correspond to a session management network element, the UPF may correspond to a user plane gateway, the UDM may correspond to a unified data management network element, and the PCF may correspond to a policy management network element. Names of the network elements are defined only for distinguishing between different functions, and should not constitute any limitation on this application. This application does not exclude a possibility of defining another network element to implement a same or similar function.

It should be further noted that a network element that can be configured to implement the foregoing UPF is not limited to the user plane gateway. For example, the network element may alternatively be a network element configured to transmit or route user plane data, such as a serving gateway (SGW), a public data network (PDN) gateway (PGW), a PDU session anchor (PDU Session anchor) session agent, or a local breakout server (LBO server).

The following embodiments are merely examples, and the embodiments of this application are described in detail by using user plane security protection deployed between the UE and the user plane gateway as an example. The user plane gateway may alternatively be replaced with a PGW and another network element that can be used to implement a same or similar function.

Figure 3:
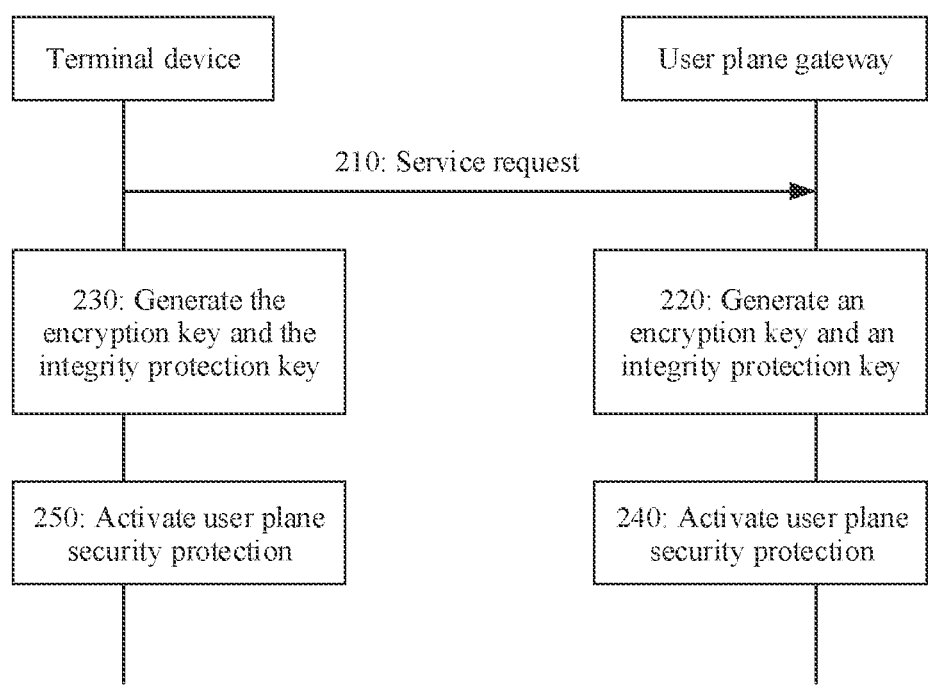
FIG. 3 is a schematic flowchart of a secure session method according to an embodiment of this application.

FIG. 3 is a schematic flowchart of a secure session method 200 according to an embodiment of this application from the perspective of device interaction. The method 200 shown in FIG. 3 may include step 210 to step 250. The following describes the steps in the method 200 in detail with reference to FIG. 3.

In step 210, UE sends a service request message. The service request message is used to request to establish a connection between the UE and a service server in a data network. As a data transmission node, a user plane gateway may finally receive the service request message from the UE.

Specifically, the UE may send the service request message through an access network device, an access and mobility management network element, and a session management network element. It may be understood that the service request message may be a NAS message. The connection to the service server in the data network that is requested to be established by using the first service request message may be used to transmit data. The data may be, for example, common data, small data, or data corresponding to a specific service. This is not limited in this application.

In a process in which the service request is sent from the UE to the user plane gateway, information carried in the service request may not change, or may change after being processed by a specific network element. In other words, the service request is not directly transparently transmitted, which is determined based on processing function requirements of different network elements. This is not limited in this application.

Step S210 may specifically include:

The UE sends a first service request message to the access and mobility management network element through the access network device.

The access and mobility management network element sends a second service request message to the session management network element based on a transmission capability of the UE.

The session management network element sends a third service request message to the user plane gateway.

Optionally, the first service request message is a service request message or a packet data unit (PDU) session establishment request message.

Optionally, the second service request message is an Nsmf interface PDU session create session management context request (Nsmf_PDUSession_CreatSMcontext Request) message sent by the access and mobility management network element to the session management network element, or a communication message (Namf_Communication_N1N2MessageTransfer) between the access and mobility management network element and the session management network element.

Optionally, the third service request message is an N4 interface session establishment/modification request message.

It should be understood that the foregoing enumerated signaling is merely an example, and should not constitute any limitation on this application. The first service request message may alternatively be another message transmitted between the UE and the access and mobility management network element, the second service request message may alternatively be another message transmitted between the access and mobility management network element and the session management network element, and the third service request message may alternatively be another message transmitted between the session management network element and the user plane gateway.

It should be further understood that the foregoing signaling is determined based on only an existing architecture and procedure, and should not constitute any limitation on this application. For example, when there is an interface between the access and mobility management network element and the user plane gateway, the access and mobility management network element may directly send the second service request message to the user plane gateway.

In step 220, the user plane gateway generates an encryption key and an integrity protection key.

The user plane gateway may generate the encryption key and the integrity protection key based on the received second service request. The encryption key and the integrity protection key may be generated based on a pre-obtained root key and a KDF algorithm. The root key may be, for example, determined based on the second service request message in step 210, or may be obtained before step 210. This is not limited in this application.

Correspondingly, in step 230, the UE generates the encryption key and the integrity protection key.

The UE may also generate the encryption key and the integrity protection key based on a pre-obtained UPF transmission root key and the KDF algorithm. A specific generation method thereof is described in detail above. For brevity, details are not described herein again.

The UPF transmission root key may be generated by the UE based on a pre-obtained intermediate key KAMF, a pre-obtained input parameter, and a key generation algorithm such as the KDF. Specific content included in the input parameter is described above by using an example. For brevity, details are not described herein again.

In this embodiment, the input parameter may be notified by the access and mobility management network element to the UE. For example, the input parameter may be indicated by the access and mobility management network element to the UE after the access and mobility management network element receives the first service request message, or may be notified by the UE to the access and mobility management network element. For example, the access and mobility management network element may determine a fresh parameter, and notify the UE of the fresh parameter. For another example, the service request message sent by the UE in step 210 may be a PDU session establishment request message, and the PDU session establishment request message carries a PDU session identifier.

Optionally, the method 200 further includes: The UE receives indication information of the UPF transmission root key from the access and mobility management network element. The indication information of the UPF transmission root key may include, for example, the input parameter used to generate the UPF transmission root key.

Optionally, the indication information of the UPF transmission root key may further include a key identifier, and the key identifier includes a KSI corresponding to the UPF transmission root key and/or an ngKSI corresponding to the first intermediate key.

In step 240, the user plane gateway activates user plane security protection.

The security protection described herein may include, for example, encryption protection and/or integrity protection. Whether to activate encryption protection and/or integrity protection may be predefined, for example, may be defined in a protocol, or may be determined based on a user plane security policy in subscription information of the UE, or may be determined based on a capability of the user plane gateway, or may be determined based on both the user plane security policy and the capability of the user plane gateway. This is not limited in this application.

The user plane gateway may activate encryption protection and/or integrity protection. In other words, it may be understood that the user plane gateway enables an encryption protection function and/or an integrity protection function. Then, the user plane gateway may perform encryption protection based on the encryption key generated in step 220, and/or perform integrity protection based on the integrity protection key generated in step 220.

Correspondingly, in step 250, the UE activates user plane security protection.

As described above, whether to activate encryption protection and/or integrity protection may be predefined, or may be determined by the user plane gateway, for example, may be determined based on the user plane security policy in the subscription information of the UE, or may be determined based on the capability of the user plane gateway, or may be determined based on both the user plane security policy in the subscription information of the UE and the capability of the user plane gateway. When whether to activate encryption protection and/or integrity protection is determined by the user plane gateway, optionally, the method 200 further includes: The user plane gateway sends security activation indication information to the UE. The security activation indication information is used to indicate whether to activate encryption protection and/or integrity protection. Then, the UE may activate encryption protection and/or integrity protection. Specifically, the UE may perform encryption protection based on the encryption key generated in step 230 and a predetermined encryption algorithm, and/or perform integrity protection based on the integrity protection key generated in step 230 and a predetermined integrity protection algorithm.

The encryption algorithm and the integrity protection algorithm may be collectively referred to as a security algorithm. The security algorithm may be predefined, for example, may be defined in a protocol, or may be determined through negotiation between the UE and the user plane gateway. This is not limited in this application.

According to the foregoing technical solution, user plane security protection is established between the UE and the user plane gateway, to implement end-to-end security protection between the UE and the user plane gateway. This is similar to establishment of an end-to-end secure channel, and the UE and the user plane gateway may securely perform data transmission on the secure channel. Encryption and/or integrity protection are/is performed on data between the UE and the user plane gateway. Therefore, compared with the prior art, this avoids a possibility that data is tampered with or stolen after being decrypted by an access network device, thereby bringing higher security.

Figure 4A:
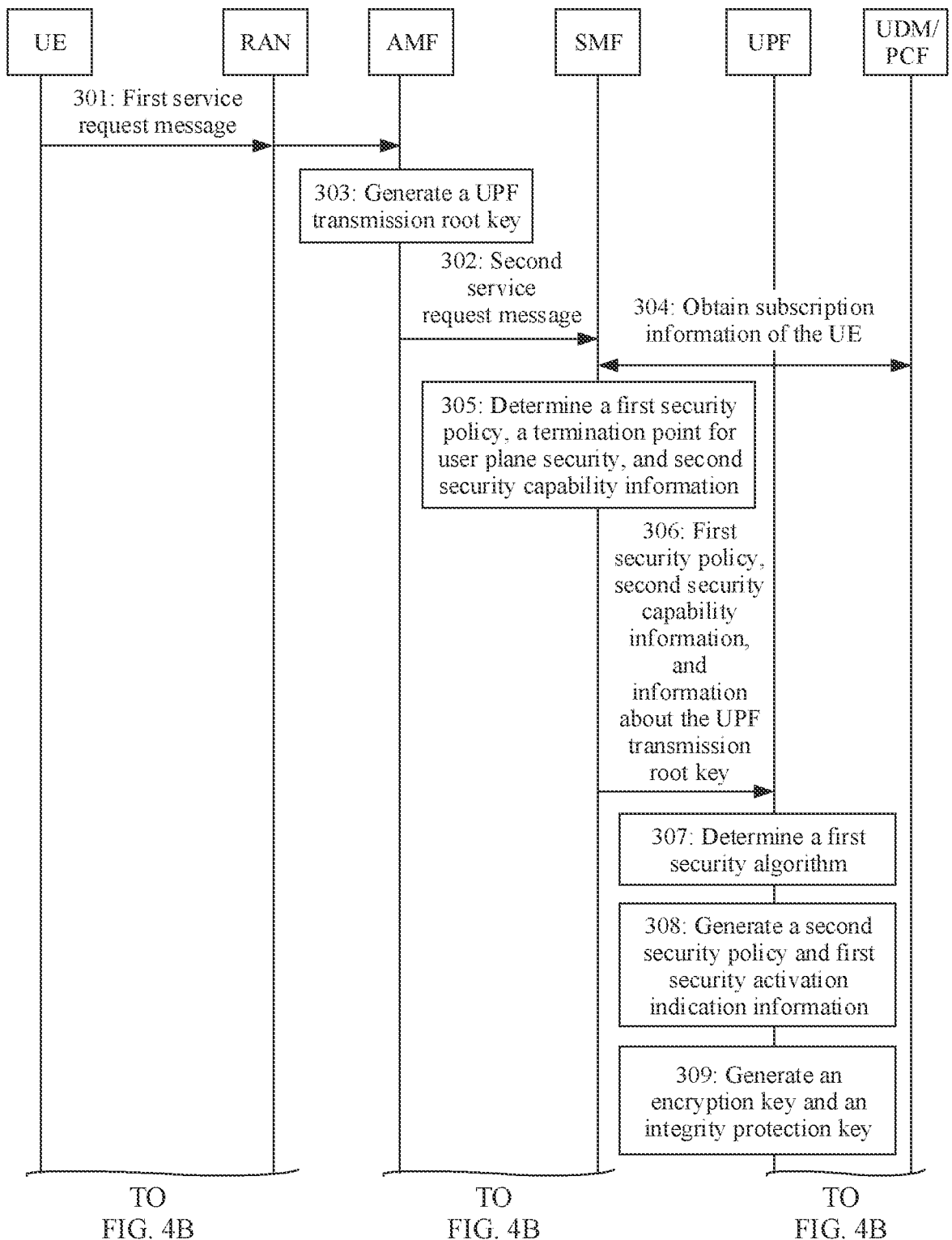
FIG. 4A and FIG. 4B are a schematic flowchart of a secure session method according to another embodiment of this application.
Figure 4B:
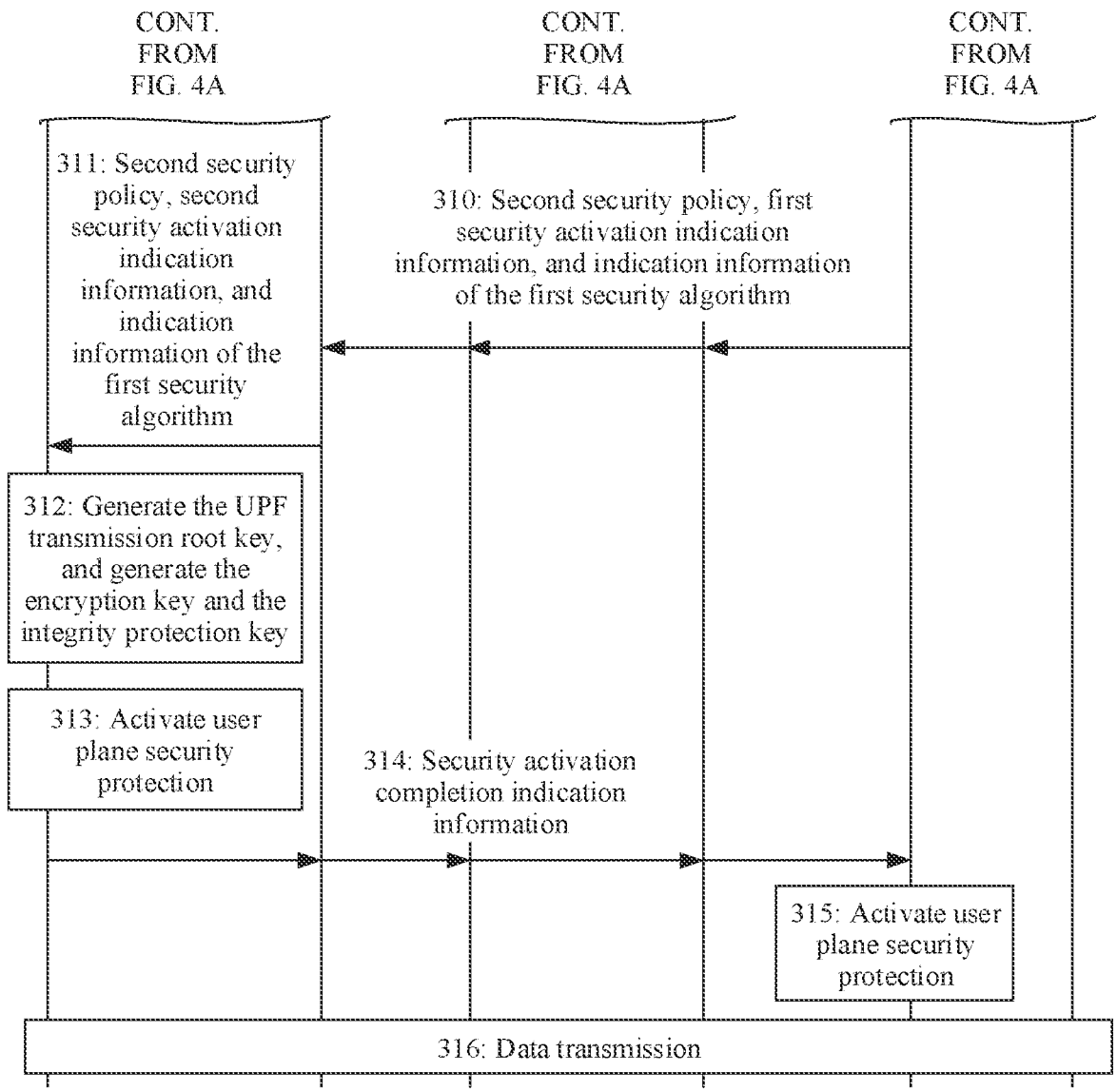

The following describes the foregoing method in more detail with reference to FIG. 4A and FIG. 4B.

FIG. 4A and FIG. 4B are a schematic flowchart of a secure session method 300 according to an embodiment of this application from the perspective of device interaction. The method 300 shown in FIG. 4A and FIG. 4B may include step 301 to step 316. The following describes the steps in the method 300 in detail with reference to FIG. 4A and FIG. 4B.

In step 301, UE sends a first service request message to an access and mobility management network element. The first service request message is used to request to establish a connection between the UE and a service server in a data network. Correspondingly, in step 301, the access and mobility management network element receives the first service request message from the UE.

Specifically, the UE may send the first service request message to an access network device, and then the access network device forwards the first service request message to the access and mobility management network element. The connection to the service server in the data network that is requested to be established by using the first service request message may be used to transmit data. The data may be, for example, common data, small data, or data corresponding to a specific service. This is not limited in this application.

A person skilled in the art may understand that the access network device may decapsulate the received message and/or add information such as address identifiers of some subsequent network elements, and then send the message to the access and mobility management network element; or the access network device may perform specific processing based on the first service request message, for example, change a status of the access network device. However, in a forwarding process of the access network device, information such as registration-related information or session-related information that is carried in the first service request and that is used when the UE needs a subsequent network element to participate in an operation does not change.

Optionally, the first service request message is a service request message or a packet data unit (PDU) session establishment request (PDU Session Establishment Request) message.

Optionally, the first service request message carries first security capability information, and the first security capability information may be used to indicate a security capability of the UE. The first security capability information may include, for example, names or identifiers of security algorithms supported by the UE or other information that may be used to indicate the security algorithms. The first security capability information may further include, for example, a priority list of the security algorithms supported by the UE.

Optionally, the first security capability information is carried in a registration request message. To be specific, before sending the first service request message in step 301, the UE may send the registration request message to the access and mobility management network element. In a registration procedure, the UE may add, to the registration request message, the first security capability information used to indicate the security capability of the UE. In this case, the first service request message may not carry the first security capability information, and a network-side network element such as the AMF may have obtained the security capability of the UE.

Optionally, the first service request message further carries transmission capability information, and the transmission capability information is used to indicate a transmission capability of the UE. In this embodiment, the transmission capability of the UE supports data transmission between the UE and a user plane gateway.

Specifically, that the UE supports data transmission between the UE and the user plane gateway may be understood as that the access network device and/or the access and mobility management network element may not need to store a context of such data transmission. For example, the context includes a security context. The access network device may directly send data to a corresponding user plane gateway based on at least one of the following information added by the UE to the service request message: the user plane gateway, the data or session transmission information, and link information of the user plane gateway that is stored by the access network device.

Optionally, the first service request message further carries an identifier of the UE. The identifier of the UE may include, for example, but is not limited to an international mobile equipment identity (IMEI), an international mobile subscriber identity (IMSI), an IP multimedia subsystem private user identity (IMS (IP multimedia subsystem) private user identity, IMPI), a temporary mobile subscriber identity (TMSI), an IP multimedia public identity (IMPU), a media access control (MAC) address, an IP address, a mobile phone number, a globally unique UE identity (GUTI) (for example, for 5G, the GUTI may be specifically a 5G GUTI), a subscription permanent identifier (SUPI), a subscription concealed identifier (SUCI), or a permanent equipment identifier (PEI).

It should be understood that the first service request message may alternatively not carry the identifier of the UE, and the access and mobility management network element may alternatively allocate a temporary identifier such as the GUTI to the UE. Alternatively, the previous registration request message already carries the identifier of the UE, for example, the SUCI, the 5G GUTI, or the PEI.

Optionally, the first service request message further carries slice-related information or specific-service-related information, for example, a service type, so that the access network device selects, based on the information such as NSSAI, an access and mobility management network element corresponding to the service type, or the access and mobility management network element selects a corresponding session management network element based on the information, or the session management network element selects a corresponding user plane gateway based on the information, or the like.

Further, optionally, the first service request message carries security requirement information of a service, and the security requirement information of the service is used to indicate a security requirement of the service. For example, the first service request message may carry information about a security algorithm required by a specific service type. It may be understood that different service types may correspond to different security algorithms. For example, a security algorithm required by a URLLC service may be different from a security algorithm required by an IoT service. For example, the IoT service may require a lightweight security algorithm, and the URLLC service may require a security algorithm with relatively high security strength.

In step 302, the access and mobility management network element sends a second service request message to the session management network element. Correspondingly, in step 302, the session management network element receives the second service request message from the access and mobility management network element.

Optionally, the second service request message is an Nsmf interface PDU session create session management context request (Nsmf_PDUSession_CreatSMcontext Request) message.

Optionally, the second service request message carries the first security capability information.

The access and mobility management network element may generate the second service request message based on the received first service request message. The second service request may carry the first security capability information. When the first service request message carries the transmission capability information, the access and mobility management network element may not add the transmission capability information to the generated second service request message because the access and mobility management network element has determined that the terminal device UE has a capability of supporting data transmission to the user plane gateway, in other words, has determined that a service connection such as a PDU session connection can be established between the terminal device UE and the user plane gateway.

Optionally, the second service request message does not carry the first security capability information.

In other words, the first service request message does not carry the first security capability information either, and the session management network element may directly obtain security capability information of the UE from subscription information of the UE.

Optionally, the second service request message further carries a UPF transmission root key or information used to generate the UPF transmission root key.

After receiving the first service request message, the access and mobility management network element may determine, based on the first service request message, that user plane security protection needs to be established between the UE and the user plane gateway. The user plane security protection between the UE and the user plane gateway may be used to protect security of data transmission between the UE and the user plane gateway. For example, if the first service request message is the PDU session establishment request, the procedure may be a session establishment procedure. In this case, the user plane security protection may be specifically used to protect PDU session data security. Therefore, the access and mobility management network element may generate a partial security context, for example, generate the UPF transmission root key KUPF. The UPF transmission root key may be used to subsequently generate an encryption key and an integrity protection key. To be specific, optionally, before step 302, the method 300 further includes step 303: The access and mobility management network element generates the UPF transmission root key KUPF based on the received first service request message.

Because the access and mobility management network element has generated the UPF transmission root key in step 303 and has determined that the user plane security protection can be established between the UE and the user plane gateway, the access and mobility management network element may actively send the generated UPF transmission root key to the session management network element through the second service request message, so as to subsequently generate the encryption key and the integrity protection key. After sending the UPF transmission root key to the session management network element, the access and mobility management network element may locally delete the UPF transmission root key, or may locally store the UPF transmission root key. This is not limited in this application.

Alternatively, the access and mobility management network element may not add the UPF transmission root key to the second service request message, and after receiving a request from the session management network element, the access and mobility management network element sends the UPF transmission root key to the session management network element. Alternatively, the access and mobility management network element may not perform step 303, and after receiving a request from the session management network element, the access and mobility management network element directly sends an intermediate key and an input parameter that are used to generate the UPF transmission root key to the session management network element, so that another subsequent network element such as the session management network element or the user plane gateway autonomously generates the UPF transmission root key. This is not limited in this application.

Alternatively, the access and mobility management network element may not generate the UPF transmission root key, in other words, the access and mobility management network element does not perform step 303, but sends the intermediate key and the input parameter that are used to generate the UPF transmission root key to the session management network element, so that a subsequent network element such as the session management network element or the user plane gateway generates the UPF transmission root key.

Specifically, the intermediate key used to generate the UPF transmission root key may be a first intermediate key KAMF, and the session management network element or the user plane gateway may generate the UPF transmission root key based on the first intermediate key, the input parameter, and a key generation algorithm such as a KDF. Alternatively, the intermediate key used to generate the UPF transmission root key may be a second intermediate key KSMF derived from the first intermediate key, and the session management network element or the user plane gateway may generate the UPF transmission root key based on the second intermediate key and the input parameter. Specific content included in the input parameter is described above by using an example. For brevity, details are not described herein again.

For ease of description below, the UPF transmission root key, or the intermediate key and the input parameter that are used to generate the UPF transmission root key are referred to as information about the UPF transmission root key. When receiving the information about the UPF transmission root key, the session management network element and the user plane gateway may determine the UPF transmission root key.

The foregoing has described in detail a specific method for generating the UPF transmission root key. For brevity, details are not described herein again.

It should be noted that the first intermediate key KAMF used to generate the UPF transmission root key may be obtained after the access and mobility management network element and the UE perform mutual authentication in a registration phase of the UE, and is separately stored in the access and mobility management network element and the UE.

Optionally, the second service request message further carries a key identifier, and the key identifier includes a KSI corresponding to the UPF transmission root key and/or an ngKSI corresponding to the first intermediate key.

The first intermediate key may change, and the UPF transmission root key may be generated based on the first intermediate key. Therefore, when the first intermediate key changes, the root key also changes accordingly. In a process of generating the UPF transmission root key based on the first intermediate key, another parameter KSI may be simultaneously derived. The KSI and the UPF transmission root key are in a one-to-one correspondence, which is the same as the foregoing case in which the ngKSI and the first intermediate key are in a one-to-one correspondence. Because the UPF transmission root key is generated based on the first intermediate key, and the first intermediate key and the ngKSI are in the one-to-one correspondence, the KSI that is in the one-to-one correspondence with the UPF transmission root key is also in a one-to-one correspondence with the ngKSI. Therefore, if the ngKSI is learned of, the first intermediate key may be learned of, and the UPF transmission root key may be determined through calculation. Similarly, if the KSI is learned of, the UPF transmission root key may be learned of.

The access and mobility management network element may add the key identifier to the second service request message. If a new key identifier is subsequently received, it may be determined that the intermediate key is updated, so that an updated UPF transmission root key can be determined based on the newly received key identifier.

Optionally, during subsequent data transmission between the UE and the user plane gateway, the key identifier may be carried in a data packet exchanged between the UE and the user plane gateway, so that the UE and the user plane gateway each obtain a corresponding key based on the key identifier to perform encryption/decryption and/or integrity protection.

Optionally, the second service request message further carries the identifier of the UE.

Specific content of the identifier of the UE is listed above. For brevity, details are not described herein again.

Optionally, the second service request message carries the slice-related information or the specific-service-related information.

Further, optionally, the second service request message carries the security requirement information of the foregoing service.

In step 304, the session management network element obtains the subscription information of the UE from a unified data management network element or a policy control network element based on the received second service request message.

Optionally, step 304 may include:

The session management network element sends a subscription information request, to request to obtain the subscription information of the UE.

The session management network element receives the subscription information of the UE.

The subscription information of the UE may be pre-stored in one of the unified data management network element and the policy control network element. The subscription information may include termination point information for user plane security, and the termination point information for the user plane security activation may be used to, for example, indicate that a termination point for the user plane security is the user plane gateway or the access network device. In this embodiment, the termination point information for the user plane security activation may indicate that the termination point for the user plane security is the user plane gateway. The subscription information may further include a user plane security policy, and the user plane security policy may be used to indicate whether to activate encryption protection and/or integrity protection.

The user plane security policy may be the same as a user plane security policy included in subscription information in the prior art. To be specific, the user plane security policy is used to indicate whether to activate encryption protection and/or integrity protection. Alternatively, the user plane security policy may be obtained by modifying the user plane security policy in the prior art. For example, the termination point information for the user plane security is also added to the user plane security policy. This is not limited in this application. For ease of description below, it is assumed that the user plane security policy does not include the termination point information for the user plane security. However, this application does not exclude a possibility that the termination point information for the user plane security is added to the user plane security policy.

Optionally, the subscription information further includes the security capability information of the UE.

The subscription information may include the security capability information of the UE, may indicate a priority of each security algorithm, and may further include supported security algorithms corresponding to various services. For example, the security capability information of the UE in the subscription information may be types or identifiers of security algorithms arranged in descending order of priorities.

In step 305, the session management network element determines a first security policy, the termination point for the user plane security, and second security capability information.

The session management network element may generate the first security policy based on the user plane security policy included in the subscription information of the UE. The first security policy may include the user plane security policy, or the first security policy may be used to indicate whether to activate encryption protection and/or integrity protection.

Alternatively, the session management network element may comprehensively determine, based on other information, for example, one or more pieces of information such as a local policy, the obtained slice-related information (for example, a termination point for user plane security of a slice in the internet of things is the user plane gateway, which may be understood as that a user accesses different slices, and locations of security termination points may be different) and a supported service type, the security termination point and/or whether to activate encryption protection and/or integrity protection. A security requirement of the service type may be obtained from the subscription information, or may be determined through interaction with another network element such as a policy control network element or an application service network element.

Therefore, it may be understood that the first security policy determined by the session management network element may be the same as or different from the user plane security policy obtained from the subscription information of the UE. This is not limited in this application.

Alternatively, the session management network element may determine, based on the termination point information for the user plane security activation included in the subscription information of the UE (for example, the termination point information is stored in the user plane security policy in the subscription information, or the subscription information clearly indicates a service type that can be accepted by the UE, such as an IoT service or an internet of vehicles service), that the termination point for the user plane security is the user plane gateway.

Optionally, the first security policy may be further used to indicate the termination point information for the user plane security, and the termination point information for the user plane security is used to indicate that the termination point for the user plane security is the user plane gateway.

It should be understood that the termination point information for the user plane security may be one information element in the first security policy, or may be information independent of the first security policy. This is not limited in this application.

The session management network element may further determine the second security capability information based on at least one of the first security capability information and the security capability information of the UE that is indicated in the subscription information of the UE. As described above, the second service request message may not carry the first security capability information, and the session management network element may obtain the subscription information of the UE from the unified data management network element or the policy control network element to obtain the security capability information of the UE from the subscription information. When the session management network element obtains the first security information and the security capability information of the UE in the subscription information of the UE, the second security capability information may be a subset of the security capability that is indicated by the first security capability information and the security capability of the UE that is indicated by the subscription information. It may be understood that the second security capability information may be different from the first security capability information, or may be the same as the first security capability information.

In an implementation, the session management network element may arrange, in descending order of priorities, security algorithms that are supported by the UE and that are determined based on the first security capability information or determined based on the first security capability information and the subscription information of the UE, to obtain the second security capability information.

Further, the session management network element may determine the second security capability information based on the security requirement of the service. As described above, the security capability of the UE may be determined based on at least one of the first security capability information and the subscription information of the UE. The session management network element may determine the second security capability information based on the first security capability information, the security capability information of the UE in the subscription information of the UE, and the security requirement information of the service. The security requirement information of the service may be sent by the UE to the session management network element through the foregoing service request messages (including the first service request message and the second service request message), or may be obtained by the session management network element by searching the subscription information of the UE based on the service type. This is not limited in this application. Therefore, the second security capability information may be considered as a security algorithm determined based on the first security capability information, the security capability information of the UE in the subscription information of the UE, and the security requirement information of the service, in other words, may be a subset of the foregoing three pieces of information.

Specific content of the second security capability information may be different from that of the first security capability information, or may be the same as that of the first security capability information.

Optionally, the first security policy may further include the second security capability information.

It should be understood that the second security capability information may be one information element in the first security policy, or may be information independent of the first security policy. This is not limited in this application.

When the first security policy includes the foregoing enumerated information, the first security policy may be used to indicate whether to activate encryption protection and/or integrity protection, indicate that the termination point for the user plane security is the user plane gateway, and indicate the security algorithm determined based on the security capability of the UE and the security requirement of the service.

In this embodiment, for ease of description, it is assumed that the first security policy is only used to indicate whether to activate encryption protection and/or integrity protection. In other words, information indicated by the first security policy and information indicated by an existing user plane security policy are the same in terms of an information item, but may be the same or may be different in terms of specific information content. However, it should be understood that this application does not exclude a possibility that the first security policy includes other information such as the second security capability information and the termination point information for the user plane security.

Optionally, the first security policy further includes security capability information of the user plane gateway. The security capability information of the user plane gateway may be obtained by the session management network element from the unified data management network element or the policy control network element.

In step 306, the session management network element sends the first security policy, the second security capability information, and the information about the UPF transmission root key to the user plane gateway. Correspondingly, in step 306, the user plane gateway receives the first security policy, the second security capability information, and the information about the UPF transmission root key from the session management network element.

After determining that the termination point for the user plane security is the user plane gateway, the session management network element may send the first security policy, the second security capability information, and the information about the UPF transmission root key to the user plane gateway.

In this embodiment, the session management network element may directly obtain the UPF transmission root key from the access and mobility management network element, or may obtain, from the access and mobility management network element, the intermediate key and the input parameter that are used to generate the UPF transmission root key. The session management network element may obtain the information about the UPF transmission root key in either of the following two manners:

Manner 1

The session management network element may determine the UPF transmission root key based on the second service request message received from the access and mobility management network element in step 302.

Optionally, the second service request message carries the UPF transmission root key, and the session management network element may directly obtain the UPF transmission root key from the second service request.

Optionally, the second service request message carries the intermediate key and the input parameter that are used to generate the UPF transmission root key, and the session management network element may autonomously generate the UPF transmission root key based on the intermediate key and another parameter that are carried in the second service request.

Manner 2

After receiving the subscription information of the UE in step 304 and determining to establish the user plane security protection between the UE and the user plane gateway, the session management network element may request to obtain the information about the UPF transmission root key from the access and mobility management gateway.

Optionally, the method 300 further includes: The session management network element obtains the information about the UPF transmission root key from the access and mobility management network element.

Specifically, the session management network element may directly receive the UPF transmission root key from the access and mobility management network element, or may receive, from the access and mobility management network element, the intermediate key and the input parameter that are used to generate the UPF transmission root key.

Optionally, that the session management network element obtains the information about the UPF transmission root key from the access and mobility management network element specifically includes:

The session management network element sends a first request to the access and mobility management network element, where the first request is used to request to obtain the information about the UPF transmission root key.

The session management network element receives the UPF transmission root key from the access and mobility management network element, or receives, from the access and mobility management network element, the intermediate key and the input parameter that are used to generate the UPF transmission root key.

If the session management network element directly obtains the UPF transmission root key from the access and mobility management network element, the session management network element may subsequently send the UPF transmission root key to the user plane gateway in step 306. If the session management network element obtains, from the access and mobility management network element, the intermediate key and the input parameter that are used to generate the UPF transmission root key, the session management network element may autonomously generate the UPF transmission root key, and send the UPF transmission root key to the user plane gateway in step 306; or the session management network element may directly forward the obtained intermediate key and input parameter that are used to generate the UPF transmission root key to the user plane gateway, so that the user plane gateway generates the UPF transmission root key.

If the session management network element directly obtains the UPF transmission root key or autonomously generates the UPF transmission root key, after sending the UPF transmission root key to the user plane gateway, the session management network element may locally delete the UPF transmission root key, or may locally store the UPF transmission root key. This is not limited in this application.

The intermediate key and the input parameter that are used to generate the UPF transmission root key are described in detail in Manner 1. For brevity, details are not described herein again.

It should be understood that, for ease of understanding, only a possible implementation in which the session management network element obtains the UPF transmission root key is shown in the figure, and should not constitute any limitation on this application.

Optionally, the session management network element sends the termination point information for the user plane security to the user plane gateway. The termination point information may indicate that the termination point for the user plane security is the user plane gateway. Optionally, the session management network element may not send the termination point information for the user plane security to the user plane gateway, but implicitly notify, by using other information such as the second security capability information or the key identifier, the user plane gateway that the user plane gateway is the security termination point. This is not limited in this application.

Optionally, the user plane security policy, the termination point information for the user plane security, and the second security capability information may be separately sent as an information element in the first security policy; or the termination point information for the user plane security and the second security capability information may be independent of the first security policy, and are sent as two pieces of independent information together with the first security policy.

Optionally, any one of the first security policy, the termination point information for the user plane security, the second security capability information, or the information about the UPF transmission root key may be carried in the foregoing third service request message. Optionally, the third service request message is an N4 interface session establishment/modification request message.

Optionally, the first security policy, the termination point information for the user plane security, the second security capability information, and the information about the UPF transmission root key are carried in same signaling. The signaling may be, for example, the third service request message described above. Certainly, the foregoing information may alternatively be carried in different signaling. This is not limited in this application.

Optionally, the third service request message carries the slice-related information or the specific-service-related information.

Optionally, the third service request message further carries the key identifier, and the key identifier is the KS corresponding to the UPF transmission root key and/or the ngKSI corresponding to the first intermediate key.

A specific function of the key identifier is described in detail above. For brevity, details are not described herein again.

In step 307, the user plane gateway determines a first security algorithm.

Because the user plane security protection between the UE and the user plane gateway needs to be activated, the UE and the user plane gateway may be understood as two termination points for the user plane security protection. For encryption and integrity protection, both the security capability of the UE and a security capability of the user plane gateway need to be considered. Therefore, the user plane gateway may determine an available security algorithm based on the security capability of the UE and the security capability of the user plane gateway. It may be understood that the first security algorithm may be an intersection set of security algorithms supported by the UE and security algorithms supported by the user plane gateway. In other words, the first security algorithm may be a security algorithm supported by both the UE and the user plane gateway. The user plane gateway and the user UE may determine the first security algorithm based on respective priority lists of the security algorithms, for example, obtain a security algorithm with a highest priority in the intersection set. In other words, the first security algorithm may be a security algorithm supported by both the UE and the user plane gateway.

In addition, as described above, the second security capability information sent by the session management network element to the session management network element may be further determined based on the security requirement of the service. Therefore, the first security algorithm may be further determined based on the security requirement of the service. The first security algorithm may be an intersection set of security algorithms indicated by the second security capability information and the security algorithms supported by the user plane gateway.

In some cases, the user plane gateway can support all security algorithms, so that the user plane gateway can directly determine the first security algorithm based on the second security capability information. For example, the user plane gateway may determine an algorithm with a highest priority in a security algorithm list in the second security capability information as the first security algorithm.

Optionally, the first security algorithm may alternatively be determined by the session management network element and then notified to the user plane gateway. In other words, the session management network element determines the first security algorithm based on the security capability of the UE and the security capability of the user plane gateway. In this case, optionally, the method further includes: The session management network element obtains the security capability of the user plane gateway. The security capability of the user plane gateway may be obtained by the session management network element from the unified data management network element or the policy control network element, or may be obtained by the session management network element from the user plane gateway, or may be preconfigured by the access and mobility management network element and obtained by the session management network element from the access and mobility management network element. This is not limited in this application. It should be understood that the figure is merely an example, and should not constitute any limitation on this application.

In step 308, the user plane gateway generates a second security policy and first security activation indication information based on the first security policy.

After receiving the first security policy, the second security capability information, and the UPF transmission root key in step 307, the user plane gateway may use the user plane gateway as the termination point for the user plane security by default. Alternatively, the session management network element may directly send the termination point information for the user plane security to the user plane gateway, and the user plane gateway may determine the user plane gateway as the termination point for the user plane security based on the information. Then, the user plane gateway may generate the second security policy and the first security activation indication information.

The second security policy may be used to indicate whether to activate encryption protection and/or integrity protection.

The user plane gateway may determine, based on the received first security policy, whether to activate encryption protection and/or integrity protection. The user plane gateway may further determine, based on the capability of the user plane gateway, whether security protection that the first security policy indicates to activate can be deactivated. For example, when the first security policy indicates to activate encryption protection and integrity protection, the user plane gateway may determine, based on the capability of the user plane gateway, whether both encryption protection and integrity protection can be activated. When the user plane gateway has an insufficient capability, the user plane gateway may select to activate either of encryption protection and integrity protection, for example, activate encryption protection or integrity protection. For another example, when the first security policy indicates to activate encryption protection or integrity protection, and the user plane gateway has a relatively strong capability, the user plane gateway may determine, based on the capability of the user plane gateway, that both encryption protection and integrity protection can be activated.

Therefore, specific content indicated in the first security policy may be the same as or different from specific content indicated in the second security policy.

In addition, the user plane gateway may generate the first security activation indication information based on the received termination point information for the user plane security. The first security activation indication information is used to indicate the access network device not to activate the user plane security protection, and is used to indicate the terminal device to activate the user plane security protection. For example, the first security activation indication information may be an indicator bit. When the indicator bit is set to "1", the first security activation indication information may be used to indicate the access network device to activate the user plane security protection; or when the indicator bit is set to "0", the first security activation indication information may be used to indicate the access network device not to activate the user plane security protection. For another example, the first security activation indication information may be a character string. When the character string is "UPF", the first security activation indication information may be used to indicate the access network device not to activate the user plane security protection; or when the character string is "RAN", the first security activation indication information may be used to indicate the access network device to activate the user plane security protection.

In this embodiment, the first security activation indication information may be used as one information element in the second security policy, or may be information independent of the second security policy. This is not limited in this application.

In this embodiment, for ease of description, it is assumed that the second security policy includes only information used to indicate whether to activate encryption protection and/or integrity protection. However, it should be understood that this application does not exclude a possibility that the second security policy includes more other information such as the first security activation indication information.

In step 309, the user plane gateway generates the encryption key and the integrity protection key.

The user plane gateway may generate the encryption key and the integrity protection key based on the key generation algorithm such as the KDF, and the UPF transmission root key received from the session management network element. Alternatively, the user plane gateway may generate the UPF transmission root key based on the intermediate key and the input parameter that are received from the session management network element and that are used to generate the UPF transmission root key, and then generate the encryption key and the integrity protection key based on the UPF transmission root key and the key generation algorithm such as the KDF.

Optionally, the user plane gateway generates the encryption key and the integrity protection key based on the UPF transmission root key, the first security algorithm, and the key generation algorithm such as the KDF.

It should be understood that a specific process of generating the UPF transmission root key and the encryption key and the integrity protection key is described in detail above. For brevity, details are not described herein again.

In step 310, the user plane gateway sends the second security policy, the first security activation indication information, and the indication information of the first security algorithm to the access network device. Correspondingly, in step 310, the access network device receives the second security policy, the first security activation indication information, and the indication information of the first security algorithm from the user plane gateway.

The second security policy, the first security activation indication information, and the indication information of the first security algorithm may be carried in same signaling, or may be carried in different signaling. This is not limited in this application.

Specifically, the user plane gateway may send the second security policy, the first security activation indication information, and the indication information of the first security algorithm to the access network device through the session management gateway and the access and mobility management network element. After receiving the first security activation indication information, the access network device may learn that the user plane gateway expects to activate the user plane security protection between the UE and the user plane gateway, but does not expect to activate user plane security protection between the UE and the access network device. Therefore, the access network device does not perform any user plane security protection activation action.

Optionally, a message used to carry the second security policy, the first security activation indication information, and the indication information of the first security algorithm may be a NAS message forwarded by the session management network element. The NAS message may include, for example, a communication message (Namf_Communication_N1N2Message Transfer) between the access and mobility management network element and the session management network element and an N2 interface message such as an N2 interface PDU session request (N2 PDU Session Request) message from the access and mobility management network element to the radio access network device.

Optionally, when the NAS message is sent to the access network device by the access and mobility management network element, the NAS message may carry the input parameter that is determined by the access and mobility management network element and that is used to generate the UPF transmission root key. Optionally, the NAS message may further carry the key identifier.

It should be understood that, that the NAS message carries the key identifier and the input parameter that is used to generate the UPF transmission root key is merely a possible implementation, and should not constitute any limitation on this application. The access and mobility management network element may alternatively send the key identifier and the input parameter that is used to generate the UPF transmission root key to the UE through separate signaling.

In step 311, the access network device sends the second security policy, the second security activation indication information, and the indication information of the first security algorithm to the UE. Correspondingly, the UE receives the second security policy, the second activation indication information, and the indication information of the first security algorithm from the access network device.

The access network device may determine, based on the received first security activation indication information, that the termination point for the user plane security is the user plane gateway, and then may generate the second security activation indication information, to indicate the UE to activate the user plane security protection.

In addition, the access network device may further send the second security policy and the indication information of the first security algorithm to the UE, so that the UE determines, based on the second security policy, whether to activate encryption protection and/or integrity protection, and performs subsequent encryption protection and/or integrity protection based on the first security algorithm. Optionally, the second security policy, the second security activation indication information, and the indication information of the first security algorithm are carried in a radio resource control (RRC) message. The RRC message may be, for example, an RRC reconfiguration message. This is not limited in this application.

In step 312, the UE generates the UPF transmission root key based on the second security activation indication, and generates the encryption key and the integrity protection key based on the UPF transmission root key.

After receiving the second security activation indication, the UE may determine that the user plane gateway is the termination point for the user plane security, generate the UPF transmission root key based on the obtained first intermediate key, and then generate the encryption key and the integrity protection key based on the UPF transmission root key. It should be understood that the UE may alternatively pre-generate the UPF transmission root key, and generate the encryption key and the integrity protection key based on the UPF transmission root key after receiving the second security activation indication. This is not limited in this application.

Optionally, before step 312, the UE receives, from the access and mobility management network element, the input parameter used to generate the UPF transmission root key.

If the input parameter used to generate the UPF transmission root key is determined by the access and mobility management network element, the access and mobility management network element may send the input parameter to the UE after generating the UPF transmission root key in step 303, so that the UE generates the UPF transmission root key based on the input parameter. The input parameter may be sent after step 303, or may be sent to the access network device together with the second security policy, the first security activation indication information, and the indication information of the first security algorithm in step 310 and then forwarded by the access network device to the UE. This is not limited in this application.

Optionally, the UE generates the encryption key and the integrity protection key based on the UPF transmission root key, the first security algorithm, and the key generation algorithm such as the KDF.

It should be understood that a specific process of generating the UPF transmission root key and the encryption key and the integrity protection key is described in detail above. For brevity, detailed descriptions of the specific process are omitted herein.

In step 313, the UE activates the user plane security protection based on the second security policy.

After receiving the second security policy from the user plane gateway, the UE may determine whether to activate encryption protection and/or integrity protection, and may further activate the user plane security protection on a UE side based on the second security policy.

In step 314, the UE sends security activation completion indication information to the user plane gateway, to notify the user plane gateway that the UE has activated the user plane security protection. Correspondingly, in step 314, the user plane gateway receives the activation completion indication information from the UE.

Optionally, the security activation completion indication information is carried in an RRC response message. The RRC response message may be, for example, an RRC reconfiguration response message. Then, the security activation completion indication information is sent to the user plane gateway through the access and mobility management network element and the session management network element.

In step 315, the user plane gateway activates the user plane security protection.

The user plane gateway may activate the user plane security protection on a user plane gateway side after receiving the security activation completion indication information from the UE, or may directly activate the user plane security protection after generating the encryption key and the integrity protection key and completing algorithm negotiation, in other words, may directly activate the security protection after step 308. This is not limited in this application.

Therefore, both the UE and the user plane gateway activate the user plane security protection, so that data transmission can be securely performed.

Optionally, the method 300 further includes step 316. The UE performs data transmission to the user plane gateway.

The UE may send uplink data to the user plane gateway, or the user plane gateway may send downlink data to the UE. This is not limited in this application. Uplink transmission is used as an example. Specifically, the UE may perform encryption and/or integrity protection on data based on security protection that the second security policy indicates to activate. For example, if the second security policy indicates to activate only encryption protection, the UE may perform only encryption on the data; if the second security policy indicates to activate only integrity protection, the UE may perform integrity protection on the data; or if the second security policy indicates to activate encryption and integrity protection, the UE may perform both encryption and integrity protection on the data.

Then, the UE may send the data on which encryption and/or integrity protection are/is performed to the user plane gateway. Correspondingly, the user plane gateway receives the data on which encryption and/or integrity protection are/is performed from the UE.

Specifically, the UE may send the data on which encryption and/or integrity protection are/is performed to the user plane gateway through the access network device, the access and mobility management network element, and the session management network element.

Then, the user plane gateway performs decryption and/or integrity verification on the received data.

Specifically, the user plane gateway may perform decryption and/or integrity protection on the data based on the security protection that the second security policy indicates to activate. For example, if the second security policy indicates to activate only encryption protection, the user plane gateway may perform only decryption on the received data; if the second security policy indicates to activate only integrity protection, the UE may perform integrity verification on the received data or if the second security policy indicates to activate encryption and integrity protection, the UE may perform decryption and integrity verification on the received data.

Optionally, a data packet transmitted between the user UE and the user plane gateway carries a key identifier. The key identifier may be used as an identifier of a security context, and is specifically used to indicate a key used by the UE and the user plane gateway.

The terminal device and the user plane gateway may separately generate a plurality of keys. Therefore, when the terminal device encrypts data by using a specific encryption key, the user plane gateway needs to decrypt the data by using a corresponding decryption key; and when the terminal device performs encryption by using a specific integrity protection key, the user plane gateway needs to perform integrity check by using a corresponding decryption key. To help a decryption end decrypt data or perform integrity check by using a correct key, an encryption end may send the data to the decryption end together with a key identifier corresponding to an encryption key or an integrity protection key, so that the decryption end determines a corresponding decryption key or integrity protection key.

It should be understood that sequence numbers of the processes do not mean execution sequences in this embodiment. The execution sequences of the processes should be determined based on functions and internal logic of the processes, and should not be construed as any limitation on the implementation processes of this embodiment of this application. For example, a sequence of performing step 307 and step 308 is not limited in this application. Step 307 may be performed before step 308, or may be performed after step 308. Likewise, a sequence of performing step 308 and step 309 is not limited in this application. Step 308 may be performed before step 309, or may be performed after step 309. In addition, step 312 may be performed after step 311, or may be performed before step 311. Moreover, step 315 may be performed after step 314, or may be performed before step 305, for example, performed after step 309. This is not limited in this application.

According to the foregoing technical solution, the user plane security protection is activated between the UE and the user plane gateway. This is similar to establishment of an end-to-end secure channel between the UE and the user plane gateway. The UE and the user plane gateway may securely perform data transmission on the secure channel. Encryption and/or integrity protection are/is performed on data between the UE and the user plane gateway. Therefore, compared with the prior art, this avoids a possibility that data is tampered with or stolen after being decrypted by the access network device, thereby bringing higher security.

Figure 5:
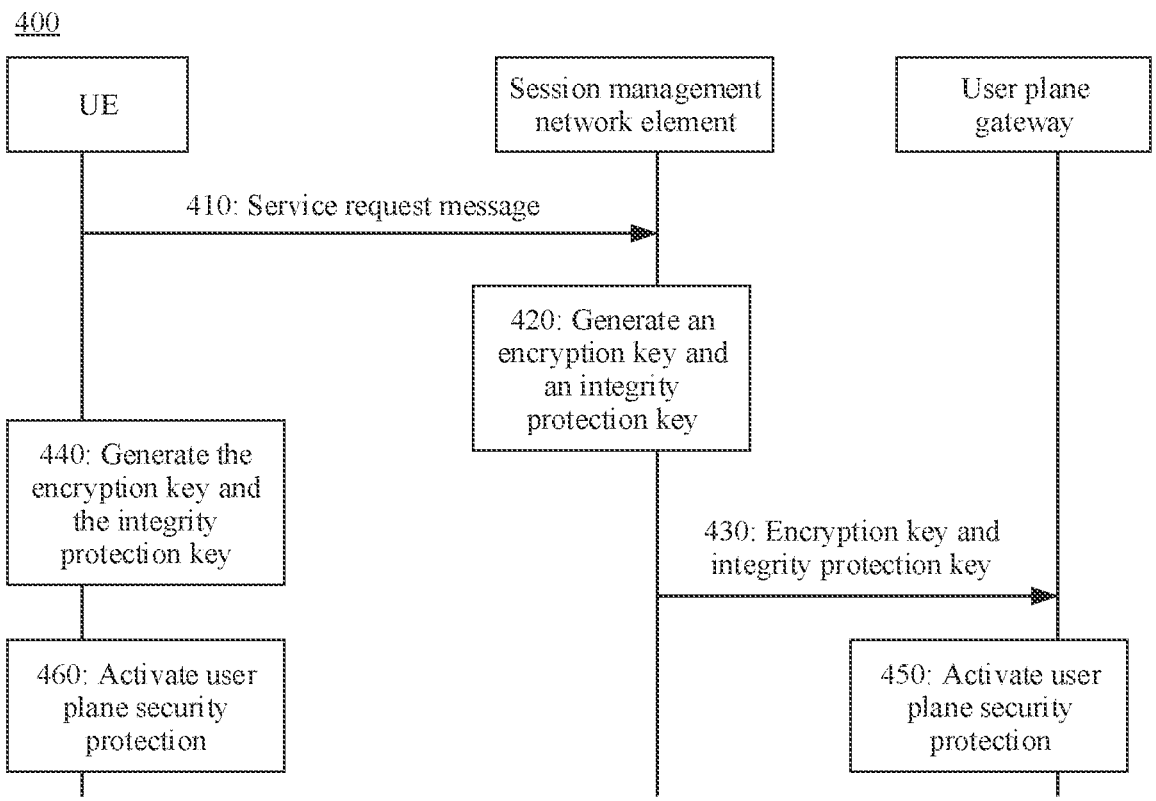
FIG. 5 is a schematic flowchart of a secure session method according to still another embodiment of this application.

FIG. 5 is a schematic flowchart of a secure session method 400 according to still another embodiment of this application from the perspective of device interaction. The method 400 shown in FIG. 5 may include step 410 to step 460. The following describes the steps in the method 400 in detail with reference to FIG. 5.

In step 410, UE sends a service request message to a session management network element. The service request message is used to request to establish a connection between the UE and a service server in a data network. Correspondingly, in step 410, the session management network element receives the service request message from the UE.

It should be understood that a specific process of step 410 is similar to that of step 210 in the foregoing method 200. Because step 210 is described in detail in the foregoing method 200, for brevity, details are not described herein again.

In step 420, the session management network element generates an encryption key and an integrity protection key based on the service request message.

The session management network element may pre-obtain a UPF transmission root key from an access and mobility management network element, to generate the encryption key and the integrity protection key based on the UPF transmission root key, and send the encryption key and the integrity protection key to a user plane gateway.

A specific process of generating the encryption key and the integrity protection key based on the UPF transmission root key is described in detail above. For brevity, details are not described herein again.

In step 430, the session management network element sends the encryption key and the integrity protection key to the user plane gateway. Correspondingly, in step 430, the user plane gateway receives the encryption key and the integrity protection key from the session management network element.

Optionally, the session management network element deletes the locally stored encryption key and integrity protection key.

Optionally, the session management network element stores the encryption key and the integrity protection key.

In step 440, the UE generates the encryption key and the integrity protection key.

A specific process of generating the encryption key and the integrity protection key based on the UPF transmission root key is described in detail above. Because step 230 is described in detail in the foregoing method 200, for brevity, details are not described herein again.

In step 450, the user plane gateway activates user plane security protection.

Correspondingly, in step 460, the UE activates user plane security protection.

A specific process of step 450 and step 460 is the same as that of step 240 and step 250 in the foregoing method 200. Because step 240 and step 250 are described in detail in the foregoing method 200, for brevity, details are not described herein again.

Optionally, the method further includes: The session management network element determines a first security algorithm.

The session management network element may determine the first security algorithm based on the service request. The first security algorithm may be determined based on a security algorithm supported by the UE and a security algorithm supported by the user plane gateway. The security algorithm supported by the user plane gateway may be, for example, obtained by the session management network element from the user plane gateway before step 410, or may be obtained by the session management network element from a unified data management network element before step 420. This is not limited in this application. In some cases, the user plane gateway can support all security algorithms, so that the session management network element can directly determine the first security algorithm based on the algorithm supported by the UE.

Optionally, the method further includes: The session management network element sends indication information of the first security algorithm to the UE. Correspondingly, the UE receives the indication information of the first security algorithm from the session management network element.

Optionally, the method further includes: The session management network element sends indication information of the first security algorithm to the user plane gateway. Correspondingly, the user plane gateway receives the indication information of the first security algorithm from the session management network element.

After determining the first security algorithm, the session management network element may separately send the indication information of the first security algorithm to the UE and the user plane gateway, so that the UE and the user plane gateway activate the security protection.

According to the foregoing technical solution, the session management network element obtains an algorithm through negotiation, generates a key, separately notifies the UE and the user plane gateway of the first security algorithm, and notifies the user plane gateway of the generated key, so as to establish the user plane security protection between the UE and the user plane gateway, thereby implementing end-to-end security protection between the UE and the user plane gateway. This is similar to establishment of an end-to-end secure channel, and the UE and the user plane gateway may securely perform data transmission on the secure channel. Encryption and/or integrity protection are/is performed on data between the UE and the user plane gateway. Therefore, compared with the prior art, this avoids a possibility that data is tampered with or stolen after being decrypted by an access network device, thereby bringing higher security.

Figure 6A:
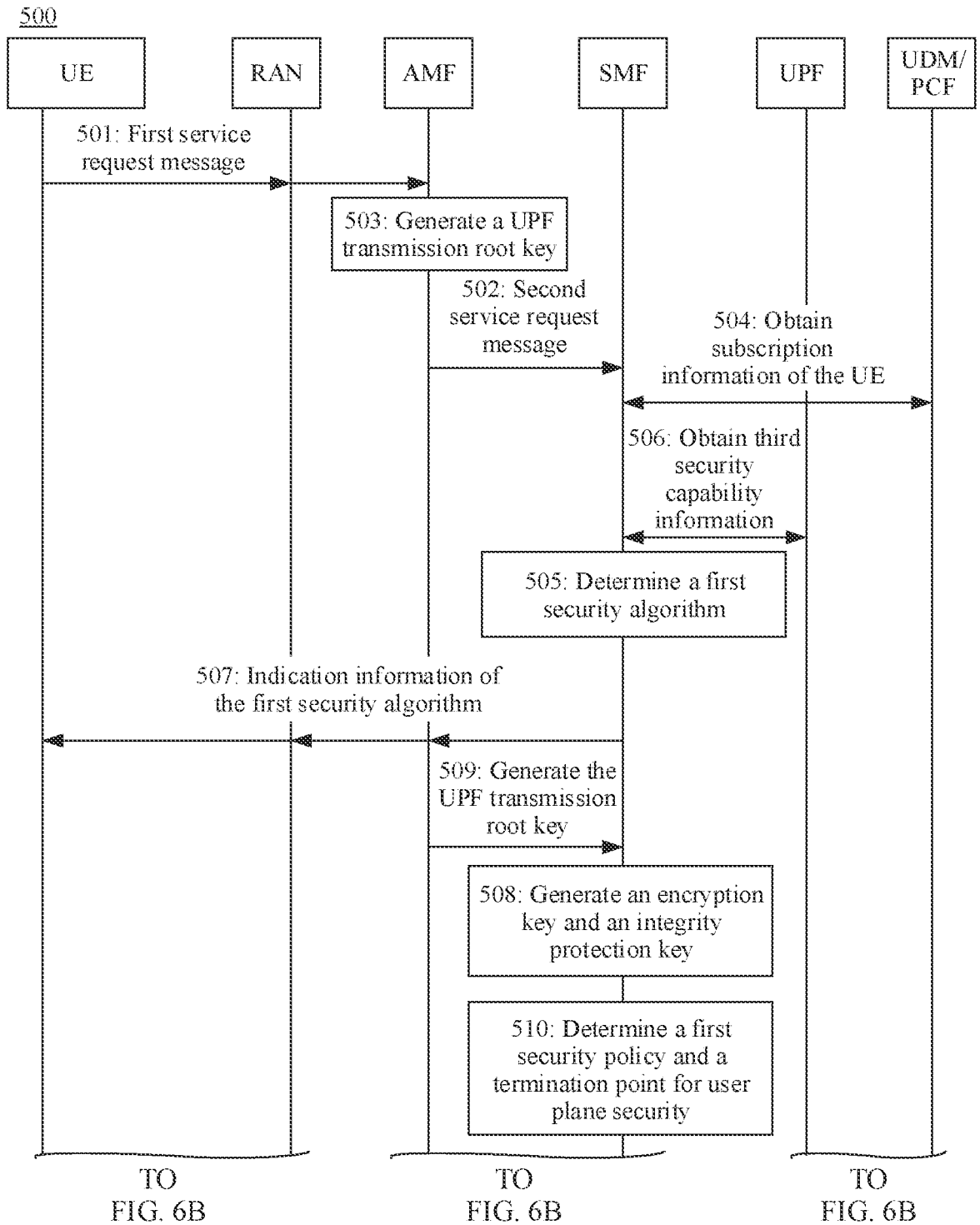
FIG. 6A and FIG. 6B are a schematic flowchart of a secure session method according to yet another embodiment of this application.
Figure 6B:
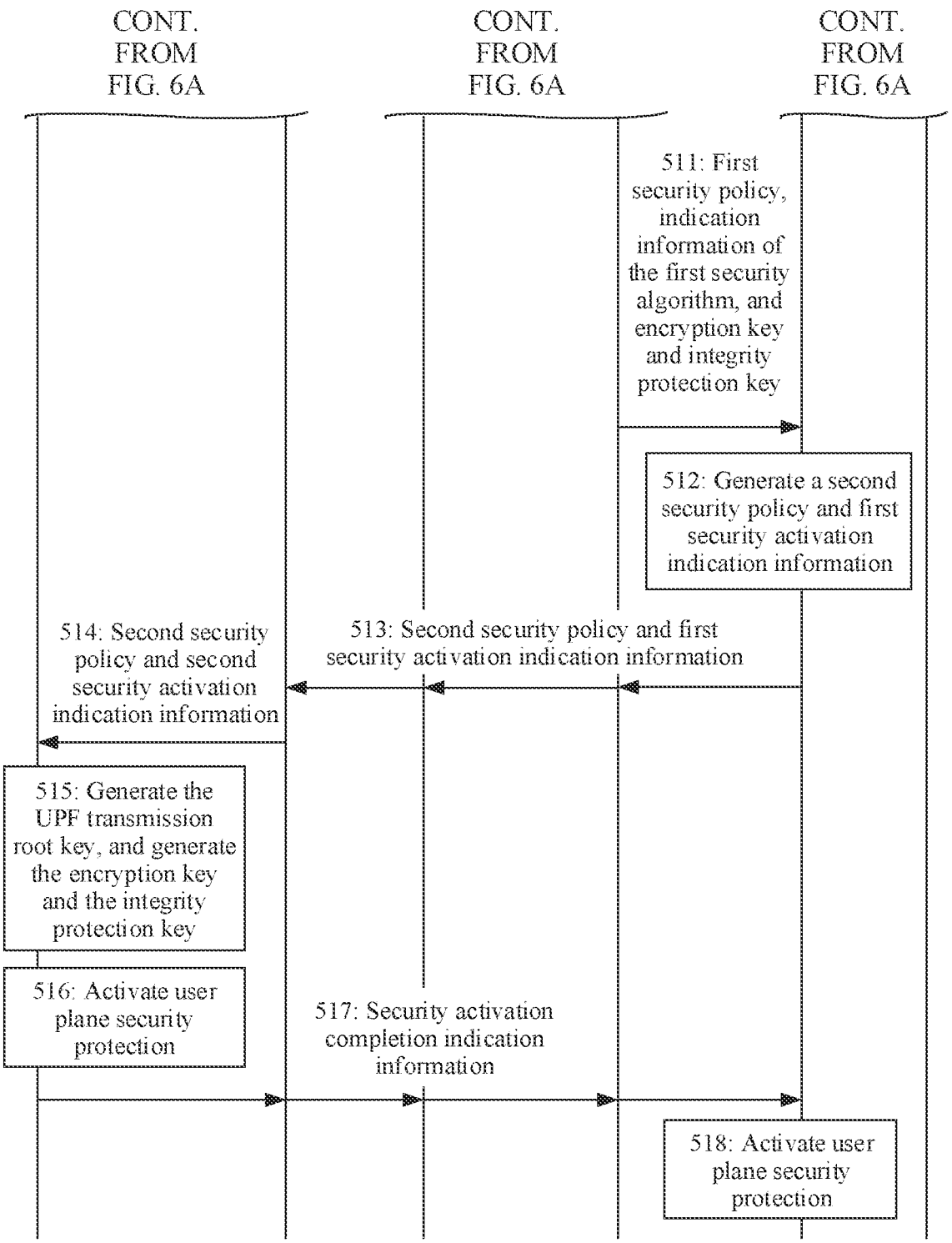

The following describes the foregoing method in more detail with reference to FIG. 6A and FIG. 6B.

FIG. 6A and FIG. 6B are a schematic flowchart of a secure session method 500 according to yet another embodiment of this application from the perspective of device interaction. The method 500 shown in FIG. 6A and FIG. 6B may include step 501 to step 518. The following describes the steps in the method 500 in detail with reference to FIG. 6A and FIG. 6B.

In step 501, UE sends a first service request message to an access and mobility management network element. The first service request message is used to request to establish a connection between the UE and a service server in a data network. Correspondingly, in step 501, the access and mobility management network element receives the first service request message from the UE.

Optionally, the first service request message carries a service type.

Optionally, the first service request message carries security requirement information of a service, and the security requirement information of the service is used to indicate a security algorithm corresponding to the service type.

Optionally, the first service request message carries first security capability information, and the first security capability information is used to indicate a security algorithm supported by the UE.

Optionally, before step 501, the method further includes: The UE sends a registration request message. The registration request message carries the first security capability information, and the first security capability information is used to indicate a security capability of the UE. In this case, the first service request message may not carry the first security capability information.

In step 502, the access and mobility management network element sends a second service request message to a session management network element based on the received first service request message. Correspondingly, in step 502, the session management network element receives the second service request message from the access and mobility management network element.

Optionally, the second service request message carries the service type.

Optionally, the second service request message carries the security requirement information of the service.

Optionally, the second service request message carries the first security capability information.

Optionally, before step 502, the method further includes step 503. The access and mobility management network element generates a UPF transmission root key KUPF based on the received first service request message.

Optionally, the access and mobility management network element may not perform step 502. Instead, the access and mobility management network element sends an intermediate key and an input parameter that are used to generate the UPF transmission root key to the session management network element, and the session management network element autonomously generates the UPF transmission root key. This is not limited in this application.

In step 504, the session management network element obtains subscription information of the UE from a unified data management network element or a policy control network element based on the received second service request.

The subscription information of the UE may include a user plane security policy, and the user plane security policy may be used to indicate whether to activate encryption protection and/or integrity protection. The subscription information of the UE may further include termination point information for user plane security, and the termination point information for the user plane security is used to indicate a termination point for the user plane security. In this embodiment, the termination point for the user plane security may be a user plane gateway.

In this embodiment, the termination point information for the user plane security may be used as one information element in the user plane security policy, or may be information independent of the user plane security policy. This is not limited in this application. For ease of description below, it is assumed that the user plane security policy does not include the termination point information for the user plane security. However, it should be understood that this application does not exclude a possibility that the user plane security policy includes the termination point information for the user plane security.

Specifically, a specific process of step 501 to step 504 is the same as that of step 301 to step 304 in the foregoing method 300. Because step 301 to step 304 are described in detail above, for brevity, details are not described herein again.

In step 505, the session management network element determines a first security algorithm.

Specifically, the session management network element may determine the first security algorithm based on the security capability of the UE and a security capability of the user plane gateway.

The security capability of the UE may be determined based on the first security capability information carried in the second service request message received in step 502, or may be determined based on the first security capability information and the subscription information of the UE that is obtained in step 504. Because the subscription information of the UE may carry security capability information of the UE, the session management network element may determine the security capability of the UE based on both the first security capability information and the security capability information of the UE that is carried in the subscription information.

A security algorithm supported by the user plane gateway may be obtained by the session management network element from the user plane gateway before step 505. Optional, the method further includes step 506: The session management network element obtains security capability information of the user plane gateway from the user plane gateway.

Specifically, step 506 may include:

The session management network element sends a second request to the user plane gateway, where the second request is used to request to obtain the security capability information of the user plane gateway.

The session management network element receives third security capability information sent by the user plane gateway, where the third security capability information indicates the security capability of the user plane gateway.

In addition, the session management network element may further perform determining based on the security requirement information of the service. The session management network element may determine, based on the previously received service type or the previously received security requirement information of the service, the security algorithm corresponding to the service type, to further determine the first security algorithm. The first security algorithm may be determined based on the security capability of the UE, the security capability of the user plane gateway, and the security requirement information of the service. Therefore, the first security algorithm may be an intersection set of security algorithms supported by the UE, security algorithms supported by the user plane gateway, and security algorithms corresponding to service types.

In some cases, the user plane gateway can support all security algorithms, so that the session management network element can determine the first security algorithm based on only the security capability of the UE or based on the security capability of the UE and the security requirement information of the service.

In step 507, the session management network element sends indication information of the first security algorithm to the UE.

After determining the first security algorithm, the session management network element may directly indicate the first security algorithm to the UE.

In step 508, the session management network element generates an encryption key and an integrity protection key based on the UPF transmission root key.

The session management network element may generate the encryption key and the integrity protection key based on the UPF transmission root key and a key generation algorithm such as a KDF.

Optionally, before step 508, the method 500 further includes step 509: The session management network element obtains information about the UPF transmission root key. A specific process in which the session management network element obtains the information about the UPF transmission root key from the access and mobility management network element may be similar to the foregoing specific process in which the session management network element obtains the information about the UPF transmission root key from the access and mobility management network element in the foregoing method 300. The session management network element may obtain the UPF transmission root key from the access and mobility management network element, or may autonomously generate the UPF transmission root key based on the intermediate key and the input parameter that are used to generate the UPF transmission root key. A specific process is described in detail in the foregoing method 300. For brevity, details are not described herein again.

In step 510, the session management network element determines a first security policy and a termination point for user plane security.

The first security policy is indication information used to indicate whether to activate encryption protection and/or integrity protection.

A specific process in which the session management network element determines the first security policy and the termination point for the user plane security is described in detail in step 305 in the foregoing method 3). For brevity, details are not described herein again.

In step 511, the session management network element sends the first security policy, the indication information of the first security algorithm, and the encryption key and the integrity protection key to the user plane gateway.

The session management network element may separately determine the first security policy, the first security algorithm, and the encryption key and the integrity protection key based on the foregoing steps, and then may send the foregoing information to the user plane gateway, so that the user plane gateway activates user plane security protection.

In this embodiment, the first security policy, the indication information of the first security algorithm, and the encryption key and the integrity protection key may be sent to the user plane gateway through same signaling, or may be sent to the user plane gateway through different signaling. This is not limited in this application.

Optionally, the session management network element deletes the encryption key and the integrity protection key.

Optionally, the session management network element stores the encryption key and the integrity protection key.

In step 512, the user plane gateway generates a second security policy and first security activation indication information based on the first security policy.

The second security policy is indication information used to indicate to activate user plane security protection between the UE and the user plane gateway and indicate whether to activate encryption protection and/or integrity protection.

A specific process in which the user plane gateway generates the second security policy and the first security activation indication information is described in detail in step 308 in the foregoing method 300. For brevity, details are not described herein again.

It may be understood that, in this embodiment, specific content indicated in the second security policy may be the same as or different from specific content indicated in the first security policy.

In step 513, the user plane gateway sends the second security policy and the first security activation indication information to an access network device. Correspondingly, in step 513, the access network device receives the second security policy and the first security activation indication information from the user plane gateway.

A specific process in which the user plane gateway sends the second security policy and the first security activation indication information to the access network device is described in detail in step 310 in the foregoing method 300. For brevity, details are not described herein again.

In this embodiment, the user plane gateway may send the second security policy and the first security activation indication information to the access network device through the session management network element. After receiving the second security policy and the first security activation indication information from the user plane gateway, the session management network element may add the indication information of the first security algorithm to same signaling and send the signaling to the access network device.

However, it should be understood that sending the indication information of the first security algorithm, the second security policy, and the first security activation indication information to the access network device through the same signaling is merely a possible implementation, and should not constitute any limitation on this application. The session management network element may alternatively send the indication information of the first security algorithm, the second security policy, and the first security activation indication information through different signaling.

In step 514, the access network device sends the second security policy, second security activation indication information, and the indication information of the first security algorithm to the UE. Correspondingly, in step 514, the UE receives the second security policy, the second security activation indication information, and the indication information of the first security algorithm from the access network device.

A specific process in which the access network device sends the second security policy, the second security activation indication information, and the indication information of the first security algorithm to the UE is described in detail in step 311 in the foregoing method 300. For brevity, details are not described herein again.

Optionally, the second security policy, the second security activation indication information, and the indication information of the first security algorithm are carried in an RRC message. The RRC message may be, for example, an RRC reconfiguration message. This is not limited in this application.

In step 515, the UE generates the UPF transmission root key, and generates the encryption key and the integrity protection key based on the UPF transmission root key.

Optionally, the UE may generate the encryption key and the integrity protection key based on the UPF transmission root key, the first security algorithm, and the key generation algorithm such as the PDF.

In step 516, the UE activates the user plane security protection based on the second security policy.

In step 517, the UE sends security activation completion indication information to the user plane gateway, to notify the user plane gateway that the UE has activated the user plane security protection. Correspondingly, the user plane gateway receives the security activation completion indication information.

In step 518, the user plane gateway activates the user plane security protection.

It should be understood that a specific process of step 515 to step 518 is the same as that of step 312 to step 315 in the foregoing method 300. Because these steps are described in detail in the foregoing method 300, for brevity, details are not described herein again.

Then, the UE may perform encryption and/or integrity protection on data, and send the data on which encryption and/or integrity protection are/is performed to the user plane gateway. The user plane gateway may perform decryption and/or integrity verification on the received data.

It should be understood that, after the UE and the user plane gateway separately activate the security protection, the UE and the user plane gateway may perform encryption protection based on the generated encryption key and/or integrity protection based on the generated integrity protection key. A specific process is described in detail in step 316 in the foregoing method 300. For brevity, details are not described herein again.

It should be understood that sequence numbers of the processes do not mean execution sequences in this embodiment. The execution sequences of the processes should be determined based on functions and internal logic of the processes, and should not be construed as any limitation on the implementation processes of this embodiment of this application. For example, a sequence of performing step 508 and step 510 is not limited in this application. Step 508 may be performed before step 510, or may be performed simultaneously with step 510, or may be performed after step 510 and before step 518. This is not limited in this application. In addition, step 518 may be performed after step 517, or may be performed before step 517. This is not limited in this application.

According to the foregoing technical solution, the session management network element obtains an algorithm through negotiation, generates a key, separately notifies the UE and the user plane gateway of the first security algorithm, and notifies the user plane gateway of the generated key, so as to establish the user plane security protection between the UE and the user plane gateway, thereby implementing end-to-end security protection between the UE and the user plane gateway. This is similar to establishment of an end-to-end secure channel, and the UE and the user plane gateway may securely perform data transmission on the secure channel. Encryption and/or integrity protection are/is performed on data between the UE and the user plane gateway. Therefore, compared with the prior art, this avoids a possibility that data is tampered with or stolen after being decrypted by the access network device, thereby bringing higher security.

Figure 7:
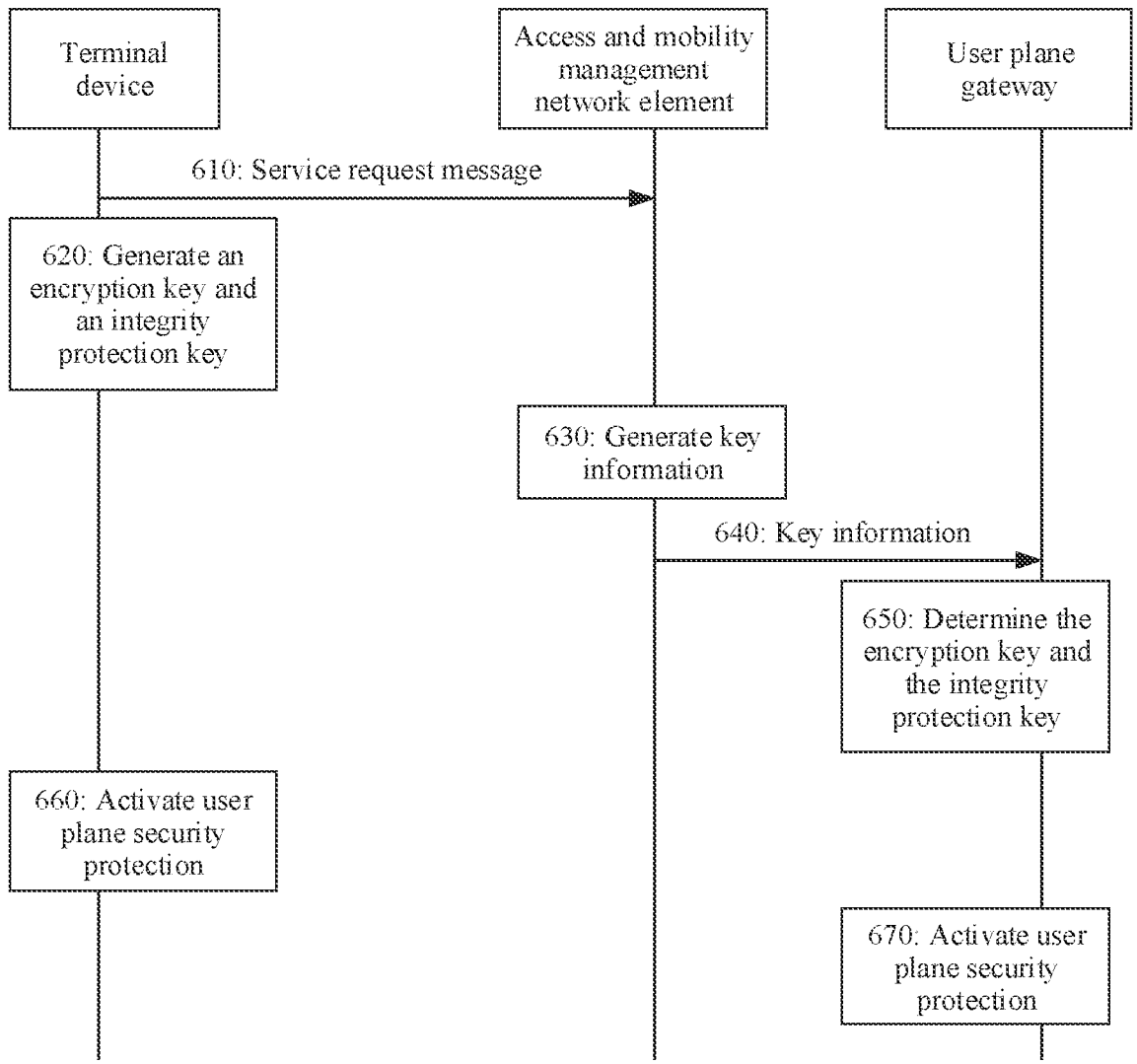
FIG. 7 is a schematic flowchart of a secure session method according to still yet another embodiment of this application.

FIG. 7 is a schematic flowchart of a secure session method 600 according to still yet another embodiment of this application from the perspective of device interaction. The method 600 shown in FIG. 7 may include step 610 to step 670. The following describes the steps in the method 600 in detail with reference to FIG. 7.

In step 610, UE sends a service request message to an access and mobility management network element. The service request is used to request to establish a connection between the UE and a service server in a data network. Correspondingly, in step 610, the access and mobility management network element receives the service request message from the UE.

A specific process of step 610 is similar to that of step 301 in the foregoing method 300. Because step 301 is described in detail in the foregoing method 300, for brevity, details are not described herein again.

In step 620, the UE generates an encryption key and an integrity protection key.

The UE may generate the encryption key and the integrity protection key based on a predetermined UPF transmission root key and a KDF algorithm. A specific generation method is described in detail above. For brevity, details are not described herein again.

The UPF transmission root key may be generated by the UE based on a pre-obtained first intermediate key KAMF and a pre-obtained input parameter. The input parameter may be notified by the access and mobility management network element to the UE, or may be notified by the UE to the access and mobility management network element. For example, the access and mobility management network element may determine a fresh parameter, and notify the UE of the fresh parameter. For another example, the service request message sent by the UE in step 610 may be a PDU session establishment request, and the PDU session establishment request carries a PDU session identifier.

In step 630, the access and mobility management network element generates key information based on the service request. The key information is the UPF transmission root key, or the key information is the encryption key and the integrity protection key.

In step 640, the access and mobility management network element sends the key information to the user plane gateway. Correspondingly, the user plane gateway receives the key information from the access and mobility management network element.

In step 650, the user plane gateway determines the encryption key and the integrity protection key based on the key information.

Specifically, the access and mobility management network element may indicate the encryption key and the integrity protection key to the user plane gateway in either of the following two manners:

Manner (a): The access and mobility management network element generates the root key based on the service request, and generates the encryption key and the integrity protection key based on the UPF transmission root key. The access and mobility management network element may send the encryption key and the integrity protection key to the user plane gateway. The user plane gateway may directly determine the encryption key and the integrity protection key based on the key information sent by the access and mobility management network element.

Manner (b): The access and mobility management network element generates the UPF transmission root key based on the service request, and sends the UPF transmission root key to the user plane gateway through the session management network element. The session management network element may generate the encryption key and the integrity protection key based on the received UPF transmission root key, and send the encryption key and the integrity protection key to the user plane gateway. Alternatively, the session management network element may directly forward the UPF transmission root key to the user plane gateway, and the user plane gateway may autonomously generate the encryption key and the integrity protection key through calculation based on the received UPF transmission root key.

A specific process of generating the encryption key and the integrity protection key based on the UPF transmission root key is described in detail above. For brevity, detailed descriptions of the specific process are omitted herein.

In step 660, the UE activates user plane security protection.

Correspondingly, in step 670, the user plane gateway activates user plane security protection.

A specific process of step 660 and step 670 is similar to that of step 240 and step 250 in the foregoing method 200. Because step 240 and step 250 are described in detail above, for brevity, details are not described herein again.

According to the foregoing technical solution, the access and mobility management network element obtains an algorithm through negotiation, generates the key information, separately notifies the UE and the user plane gateway of a first security algorithm, and notifies the user plane gateway of the generated key, so as to establish the user plane security protection between the UE and the user plane gateway, thereby implementing end-to-end security protection between the UE and the user plane gateway. This is similar to establishment of an end-to-end secure channel, and the UE and the user plane gateway may securely perform data transmission on the secure channel. Encryption and/or integrity protection are/is performed on data between the UE and the user plane gateway. Therefore, compared with the prior art, this avoids a possibility that data is tampered with or stolen after being decrypted by an access network device, thereby bringing higher security.

Figure 8A:
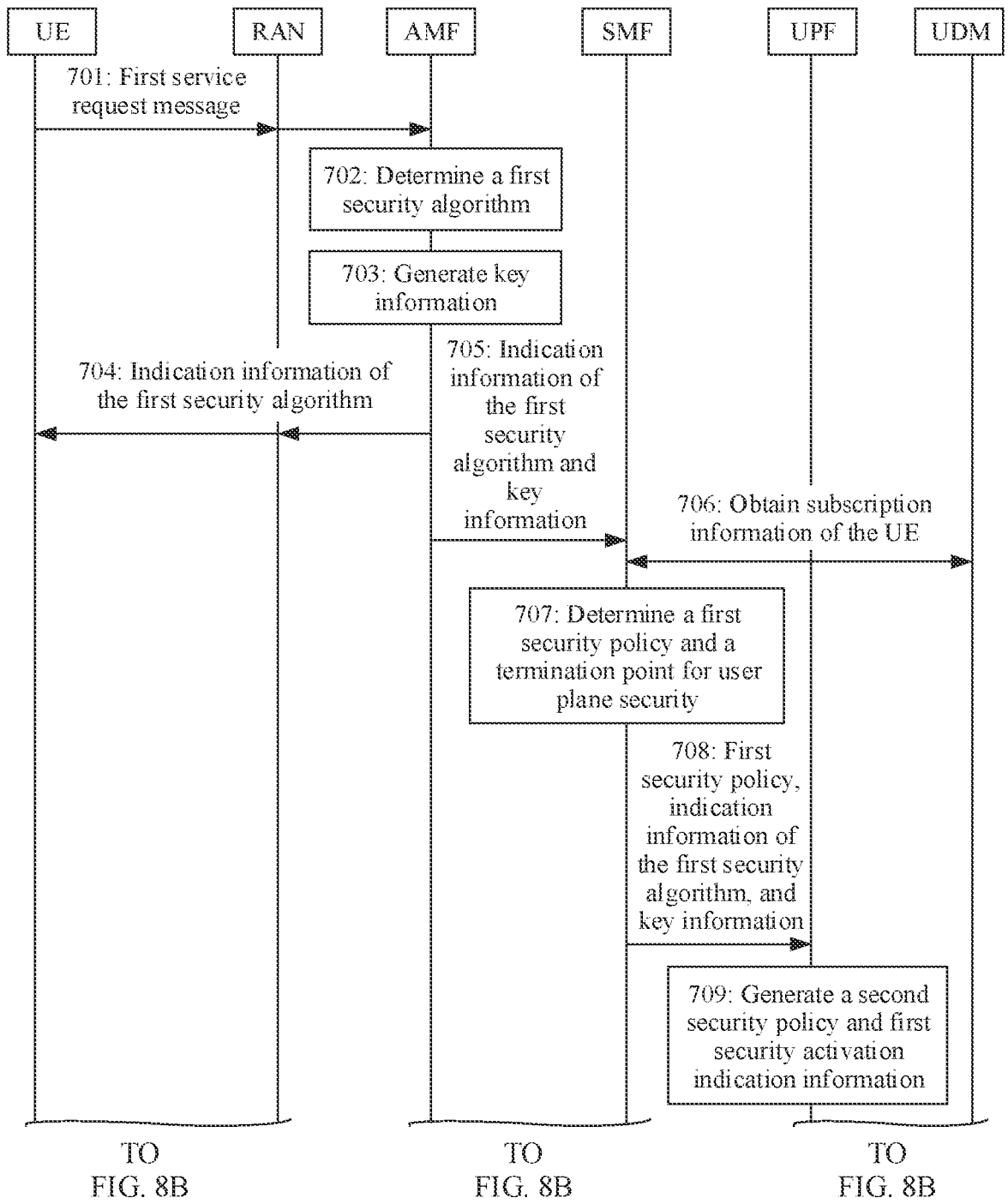
FIG. 8A and FIG. 8B are a schematic flowchart of a secure session method according to a further embodiment of this application.
Figure 8B:
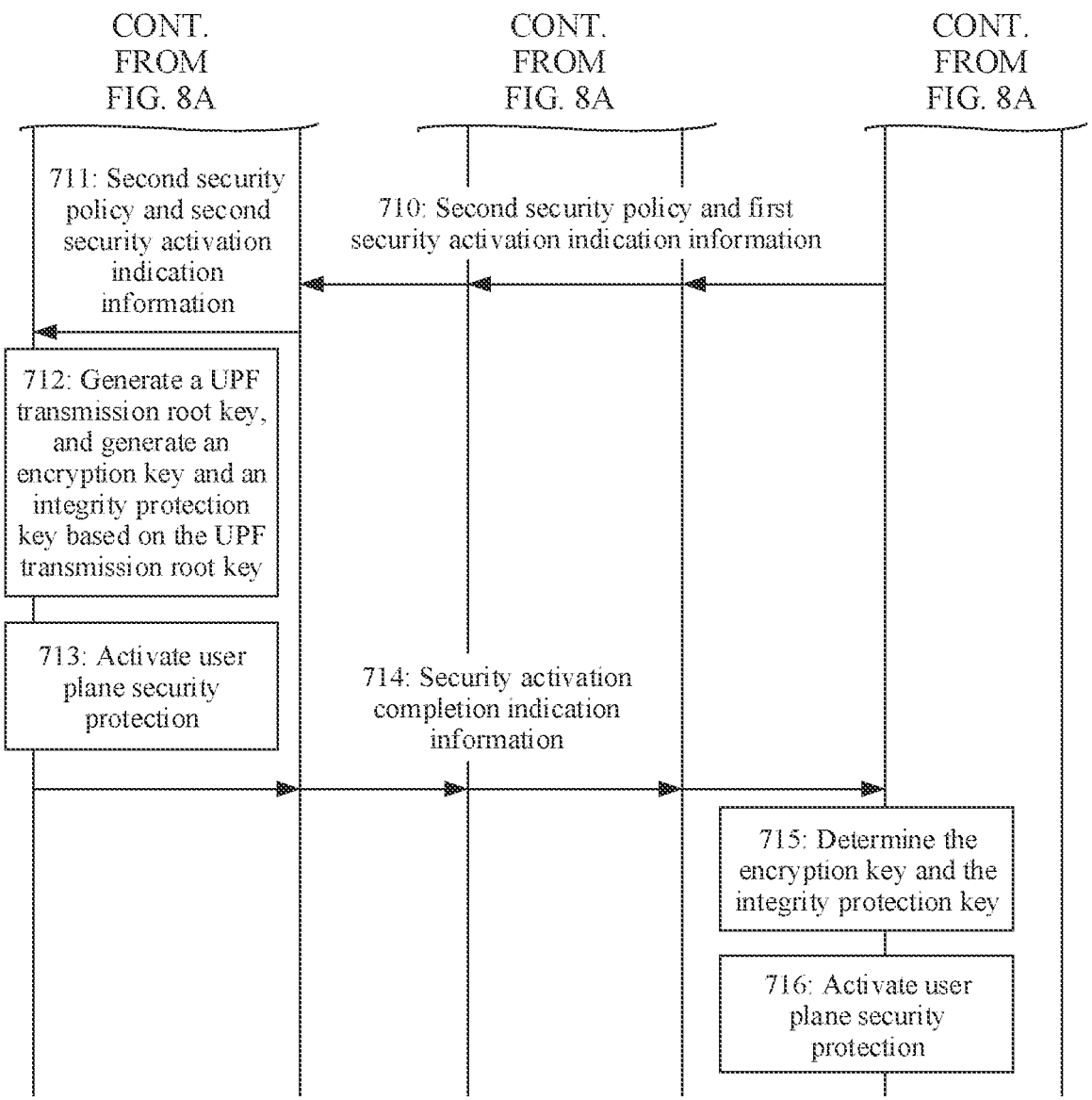

The following describes the foregoing method in more detail with reference to FIG. 8A and FIG. 8B.

FIG. 8A and FIG. 8B are a schematic flowchart of a secure session method 700 according to a further embodiment of this application from the perspective of device interaction. The method 700 shown in FIG. 8A and FIG. 8B may include step 701 to step 716. The following describes the steps in the method 700 in detail with reference to FIG. 8A and FIG. 8B.

In step 701, UE sends a first service request message to an access and mobility management network element. The first service request is used to request to establish a connection between the UE and a service server in a data network. Correspondingly, in step 701, the access and mobility management network element receives the first service request message from the UE.

Optionally, the first service request message carries a service type.

Optionally, the first service request message carries security requirement information of a service, and the security requirement information of the service is used to indicate a security algorithm corresponding to the service type.

Optionally, the first service request message carries first security capability information, and the first security capability information is used to indicate a security algorithm supported by the UE.

Optionally, before step 701, the method further includes: The UE sends a registration request message. The registration request message carries the first security capability information, and the first security capability information is used to indicate a security capability of the UE. In this case, the first service request message may not carry the first security capability information.

Optionally, the access and mobility management network element may alternatively obtain security capability information of the UE from subscription information of the UE, and the UE does not need to indicate the security capability information by using the first security capability information. The subscription information of the UE may be directly obtained by the access and mobility management network element from a unified data management network element or a policy control network element, or may be obtained by a session management network element from a unified data management network element or a policy control network element and forwarded to the access and mobility management network element. This is not limited in this application.

Optionally, the first service request message carries transmission capability information of the UE, and the transmission capability information of the UE is used to indicate that a transmission capability of the UE supports data transmission between the UE and a user plane gateway.

In step 702, the access and mobility management network element determines a first security algorithm based on the first service request message.

Specifically, the access and mobility management network element may determine the first security algorithm based on the security capability of the UE and a security capability of the user plane gateway.

The security capability of the UE may be determined based on the first security capability information received before step 702. The security capability of the user plane gateway may be obtained by the session management network element from the user plane gateway or the unified data management network element and forwarded to the access and mobility management network element, or may be obtained by the access and mobility management network element from the unified data management network element, or may be preconfigured and stored in the access and mobility management network element. This is not limited in this application.

Further, the first security algorithm may be determined based on the security requirement information of the service. The access and mobility management network element may determine, based on the service type or the security requirement information of the service that is received before step 702, the security algorithm corresponding to the service type, to further determine the first security algorithm. The first security algorithm may be determined based on the security capability of the UE, the security capability of the user plane gateway, and the security requirement information of the service. Therefore, the first security algorithm may be an intersection set of security algorithms supported by the UE, security algorithms supported by the user plane gateway, and security algorithms corresponding to service types.

In some cases, the user plane gateway can support all security algorithms, so that the access and mobility management network element can determine the first security algorithm based on only the security capability of the UE or based on the security capability of the UE and the security requirement information of the service.

In step 703, the access and mobility management network element generates key information based on the first service request message.

In this embodiment, the access and mobility management network element generates a UPF transmission root key based on the first service request message. Optionally, the access and mobility management network element may further generate an encryption key and an integrity protection key based on the UPF transmission root key. It may be understood that the UPF transmission root key may be used to generate the encryption key and the integrity protection key. For ease of description, the UPF transmission root key, or the encryption key and the integrity protection key generated based on the UPF transmission root key are referred to as the key information. When receiving the UPF transmission root key, or the encryption key and the integrity protection key, the user plane gateway may determine the encryption key and the integrity protection key.

Optionally, the key information further includes a key identifier, and the key identifier includes a KSI corresponding to the UPF transmission root key and/or an ngKSI corresponding to a first intermediate key.

Optionally, the access and mobility management network element may specifically generate the encryption key and the integrity protection key based on the UPF transmission root key and the first security algorithm.

In step 704, the access and mobility management network element sends indication information of the first security algorithm to the UE. Correspondingly, in step 704, the UE receives the indication information of the first security algorithm from the access and mobility management network element.

In an implementation, step 701 to step 704 may be performed in a registration procedure.

Optionally, the first service request message is a registration request message, and the registration request message may carry the first security capability information.

The access and mobility management network element may determine the first security algorithm in the registration procedure, and indicate the first security algorithm to the UE by using an existing NAS security mode command (SMC) message. In other words, optionally, the indication information of the first security algorithm may be carried in the existing NAS security mode command (SMC) message.

Specifically, a NAS SMC procedure is performed in NR or LTE to activate a newly established NAS security context, so as to establish a secure signaling connection between the UE and a core network device (for example, the access and mobility management network element), thereby providing integrity and confidentiality protection for NAS signaling data. In this embodiment, a specific NAS SMC procedure may be as follows.

First, the access and mobility management network element enables encryption protection.

Then, the access and mobility management network element sends the NAS SMC message to the UE. The NAS SMC message may include, for example, information such as the security capability of the UE, a selected security algorithm (including an encryption algorithm and an integrity protection algorithm), or the ngKSI. In this embodiment, the selected security algorithm may include the first security algorithm and a security algorithm obtained through negotiation between the access and mobility management network element and the UE. Optionally, the NAS SMC message includes the KSI.

It should be noted that the security capability of the UE, the security algorithm obtained through negotiation between the access and mobility management network element and the UE, and the ngKSI may be information carried in an existing NAS SMC message. In this application, the existing NAS SMC message may be reused to indicate the first security algorithm to the UE. However, it should be understood that this should not constitute any limitation on this application. The indication information of the first security algorithm may alternatively be sent through separate signaling.

The access and mobility management network element may perform integrity protection on the information in the NAS SMC message, generate MAC, and send the generated MAC and the foregoing enumerated information to the UE through the NAS SMC message.

After receiving the NAS SMC message from the access and mobility management network element, the UE may perform integrity verification on the NAS SMC message based on the MAC. If the verification succeeds, the UE enables uplink encryption, downlink decryption, and integrity protection. In this way, the UE completes security activation.

Then, the UE sends a NAS security mode complete message to the core network device. The NAS security mode complete message is used to perform encryption and integrity protection by using encryption and integrity protection algorithms selected in the NAS SMC message.

The access and mobility management network element may enable uplink decryption after sending the NAS SMC message, and enable downlink decryption after receiving the NAS security mode complete message from the UE. In this way, the access and mobility management network element completes security activation.

Because the access and mobility management network element enables uplink decryption and downlink encryption in the NAS SMC procedure, the first security algorithm also needs to be a security algorithm supported by the access and mobility management network element.

Optionally, the access and mobility management network element determines the first security algorithm based on the security algorithm supported by the UE, the security algorithm supported by the user plane gateway, and the security algorithm supported by the access and mobility management network element.

In other words, the first security algorithm may be an intersection set of the security algorithms supported by the UE, the security algorithms supported by the user plane gateway, the security algorithms corresponding to the service types, and the security algorithms supported by the access and mobility management network element.

Optionally, the NAS SMC carries the key identifier. The NAS SMC carries the key identifier, so that the UE and the access and mobility management network element can use corresponding encryption keys and integrity protection keys.

In another implementation, step 701 to step 704 may be performed in a session establishment procedure.

Optionally, the first service request message is a service request message or a PDU session establishment request message. The first security capability information may be sent to the access and mobility management network element through the registration request message in the previous registration procedure, or may be sent to the access and mobility management network element through the first service request message. This is not limited in this application.

After determining the first security algorithm, the access and mobility management network element may temporarily not send the indication information of the first security algorithm. When there is signaling to be sent to the UE subsequently, the access and mobility management network element sends the indication information of the first security algorithm through the signaling. For example, when receiving a second security policy and first security activation indication information that are subsequently forwarded by the session management network element in step 710, the access and mobility management network element may also forward the indication information of the first security algorithm to an access network device. Optionally, the second security policy, the first security activation indication information, and the indication information of the first security algorithm that are sent by the user plane gateway to the access and mobility management network element may be carried in a communication message (Namf_Communication_N1N2MessageTransfer) between the access and mobility management network element and the session management network element. Optionally, the second security policy, the first security activation indication information, and the indication information of the first security algorithm that are sent by the access and mobility management network element to the access network device may be carried in an N2 interface PDU session request.

In step 705, the access and mobility management network element sends the indication information of the first security algorithm and the key information to the session management network element. Correspondingly, the session management network element receives the indication information of the first security algorithm and the key information from the access and mobility management network element.

It should be understood that the indication information of the first security algorithm and the key information may be carried in same signaling, or may be carried in different signaling. This is not limited in this application.

Optionally, the indication information of the first security algorithm and the key information that are sent by the access and mobility management network element to the session management network element may be carried in a communication message (Namf_Communication_N1N2MessageTransfer) between the access and mobility management network element and the session management network element.

In step 706, the session management network element obtains the subscription information of the UE.

In step 707, the session management network element determines a first security policy and a termination point for user plane security.

It should be understood that a specific process in which the session management network element obtains the subscription information of the UE and determines the first security policy and the termination point for the user plane security is described in detail with reference to step 304 and step 305 in the foregoing method 300. For brevity, details are not described herein again.

In step 708, the session management network element sends the first security policy, the indication information of the first security algorithm, and the key information to the user plane gateway.

After determining that the termination point for the user plane security is the user plane gateway in step 707, the session management network element may send both the indication information of the first security algorithm and the key information that are received in step 705 and the first security policy determined in step 707 to the user plane gateway.

Optionally, the method further includes: The session management network element sends indication information of the security termination point to the user plane gateway. The indication information of the security termination point may be sent to the user plane gateway together with the first security policy, the indication information of the first security algorithm, and the key information.

When sending the indication information of the security termination point to the user plane gateway, the session management network element may send the indication information of the security termination point as an information element in the first security policy, or may send the indication information of the security termination point and the first security policy as two pieces of information. This is not limited in this application.

It should be understood that the session management network element may alternatively not send the indication information of the security termination point to the user plane gateway. When sending any one of the first security policy, the indication information of the first security algorithm, and the key information to the user plane gateway, the session management network element may implicitly indicate that the user plane gateway is the security termination point.

In step 709, the user plane gateway generates the second security policy and the first security activation indication information.

It should be understood that a specific process in which the user plane gateway generates the second security policy and the first security activation indication information is described in detail with reference to step 308 in the foregoing method 300. For brevity, details are not described herein again.

In step 710, the user plane gateway sends the second security policy and the first security activation indication information to the access network device. Correspondingly, the access network device receives the second security policy and the first security activation indication information from the user plane gateway.

As described above, optionally, when receiving the second security policy and the first security activation indication information from the user plane gateway, the access and mobility management network element may also send the indication information of the predetermined first security algorithm to the access network device.

In step 711, the access network device sends the second security policy and second security activation indication information to the UE.

After receiving the first security activation indication information, the access network device may determine not to activate user plane security protection of the access network device, and may further generate the second security activation indication information, to indicate the UE to activate the user plane security protection. Alternatively, the access network device may directly forward the first security activation indication information to the UE. In other words, the second security activation indication information may be the same as or different from the first security activation indication information. This is not limited in this application.

If the access and mobility management network element sends the indication information of the first security algorithm to the access network device together with the second security policy and the first security activation indication information, the access network device may further send the indication information of the first security algorithm, the second security policy, and the second security activation indication information to the UE.

A specific process in which the access network device sends the second security policy, the second security activation indication information, and the indication information of the first security algorithm to the UE is described in detail with reference to step 311 in the foregoing method 300. For brevity, details are not described herein again.

In step 712, the UE generates the UPF transmission root key, and generates the encryption key and the integrity protection key based on the UPF transmission root key.

In step 713, the UE activates the user plane security protection.

In step 714, the UE sends security activation completion indication information.

A specific process of step 712 to step 714 is the same as that of step 312 to step 314 in the foregoing method 300. Because step 312 to step 314 are described in detail above, for brevity, details are not described herein again.

In step 715, the user plane gateway determines the encryption key and the integrity protection key based on the received key information.

As described above, the key information may be the root key, or may be the encryption key and the integrity protection key. If the key information is the root key, the user plane gateway may autonomously generate the encryption key and the integrity protection key based on the root key, or the session management network element may generate the encryption key and the integrity protection key based on the root key and sends the generated encryption key and integrity protection key to the user plane gateway in a process in which the key information is forwarded by the session management network element. If the key information is the encryption key and the integrity protection key, the session management network element may directly determine the encryption key and the integrity protection key based on the key information.

In step 716, the user plane gateway activates the user plane security protection.

A specific process of step 716 is the same as that of step 315 in the foregoing method 300. Because step 315 is described in detail above, for brevity, details are not described herein again.

Then, the UE may perform encryption and/or integrity protection on data, and send the data on which encryption and/or integrity protection are/is performed to the user plane gateway. The user plane gateway may perform decryption and/or integrity verification on the received data.

It should be understood that, after the UE and the user plane gateway separately activate the security protection, the UE and the user plane gateway may perform encryption protection based on the generated encryption key and/or integrity protection based on the generated integrity protection key. A specific process is described in detail in step 316 in the foregoing method 300. For brevity, details are not described herein again.

It should be further understood that step 706 does not necessarily need to be performed after step 705, and step 706 may be performed before step 705. For example, step 706 may be performed after step 701, or may be performed before step 707. This is not limited in this application. Step 709 and step 710 do not necessarily need to be performed after step 708, and step 709 and step 710 may be performed before step 708. For example, step 709 and step 710 may be performed after step 705, or may be performed before step 705. This is not limited in this application.

According to the foregoing technical solution, the access and mobility management network element obtains an algorithm through negotiation, generates the key information, separately notifies the UE and the user plane gateway of the first security algorithm, and notifies the user plane gateway of the generated key, so as to establish the user plane security protection between the UE and the user plane gateway, thereby implementing end-to-end security protection between the UE and the user plane gateway. This is similar to establishment of an end-to-end secure channel, and the UE and the user plane gateway may securely perform data transmission on the secure channel. Encryption and/or integrity protection are/is performed on data between the UE and the user plane gateway. Therefore, compared with the prior art, this avoids a possibility that data is tampered with or stolen after being decrypted by the access network device, thereby bringing higher security.

The foregoing describes in detail the secure session methods provided in the embodiments of this application with reference to FIG. 3 to FIG. 8A and FIG. 8B. The following describes in detail secure session apparatuses provided in the embodiments of this application with reference to FIG. 9 and FIG. 10.

Figure 9:
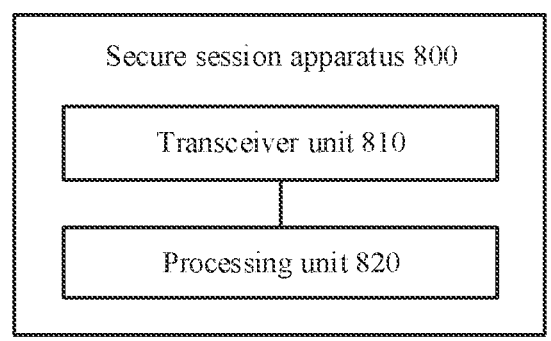
FIG. 9 is a schematic block diagram of a secure session apparatus according to an embodiment of this application.

FIG. 9 is a schematic block diagram of a secure session apparatus 800 according to an embodiment of this application. As shown in the figure, the secure session apparatus 800 may include a transceiver unit 810 and a processing unit 820.

In a possible design, the secure session apparatus 800 may be the user plane gateway in the foregoing method embodiments, or may be a chip configured to implement functions of the user plane gateway in the foregoing method embodiments.

Specifically, the secure session apparatus 800 may correspond to the user plane gateway in the methods 200 to 700 according to the embodiments of this application. The secure session apparatus 800 may include units configured to perform the methods performed by the user plane gateway in the method 200 in FIG. 3 to the method 700 in FIG. 8A and FIG. 8B. In addition, the units in the secure session apparatus 800 and the foregoing other operations and/or functions are separately used to implement a corresponding procedure of the method 200 in FIG. 3, the method 300 in FIG. 4A and FIG. 4B, the method 400 in FIG. 5, the method 500 in FIG. 6A and FIG. 6B, the method 600 in FIG. 7, or the method 700 in FIG. 8A and FIG. 8B. It should be understood that a specific process in which each unit performs the foregoing corresponding steps is described in detail in the foregoing method embodiments. For brevity, details are not described herein again.

In another possible design, the secure session apparatus 800 may be the session management network element in the foregoing method embodiments, or may be a chip configured to implement functions of the session management network element in the foregoing method embodiments.

Specifically, the secure session apparatus 800 may correspond to the session management network element in the methods 200 to 700 according to the embodiments of this application. The secure session apparatus 800 may include units configured to perform the methods performed by the session management network element in the method 200 in FIG. 3 to the method 700 in FIG. 8A and FIG. 8B. In addition, the units in the secure session apparatus 800 and the foregoing other operations and/or functions are separately used to implement a corresponding procedure of the method 200 in FIG. 3, the method 300 in FIG. 4A and FIG. 4B, the method 400 in FIG. 5, the method 500 in FIG. 6A and FIG. 6B, the method 600 in FIG. 7, or the method 700 in FIG. 8A and FIG. 8B. It should be understood that a specific process in which each unit performs the foregoing corresponding steps is described in detail in the foregoing method embodiments. For brevity, details are not described herein again.

In another possible design, the secure session apparatus 800 may be the access and mobility management network element in the foregoing method embodiments, or may be a chip configured to implement functions of the access and mobility management network element in the foregoing method embodiments.

Specifically, the secure session apparatus 800 may correspond to the access and mobility management network element in the methods 200 to 700 according to the embodiments of this application. The secure session apparatus 800 may include units configured to perform the methods performed by the access and mobility management network element in the method 200 in FIG. 3 to the method 700 in FIG. 8A and FIG. 8B. In addition, the units in the secure session apparatus 800 and the foregoing other operations and/or functions are separately used to implement a corresponding procedure of the method 200 in FIG. 3, the method 300 in FIG. 4A and FIG. 4B, the method 400 in FIG. 5, the method 500 in FIG. 6A and FIG. 6B, the method 600 in FIG. 7, or the method 700 in FIG. 8A and FIG. 8B. It should be understood that a specific process in which each unit performs the foregoing corresponding steps is described in detail in the foregoing method embodiments. For brevity, details are not described herein again.

In another possible design, the secure session apparatus 800 may be the UE in the foregoing method embodiments, or may be a chip configured to implement functions of the UE in the foregoing method embodiments.

Specifically, the secure session apparatus 800 may correspond to the UE in the methods 200 to 700 according to the embodiments of this application. The secure session apparatus 800 may include units configured to perform the methods performed by the UE in the method 200 in FIG. 3 to the method 700 in FIG. 8A and FIG. 8B. In addition, the units in the secure session apparatus 800 and the foregoing other operations and/or functions are separately used to implement a corresponding procedure of the method 200 in FIG. 3, the method 300 in FIG. 4A and FIG. 4B, the method 400 in FIG. 5, the method 500 in FIG. 6A and FIG. 6B, the method 600 in FIG. 7, or the method 700 in FIG. 8A and FIG. 8B.

It should be understood that a specific process in which each unit performs the foregoing corresponding steps is described in detail in the foregoing method embodiments. For brevity, details are not described herein again.

Figure 10:
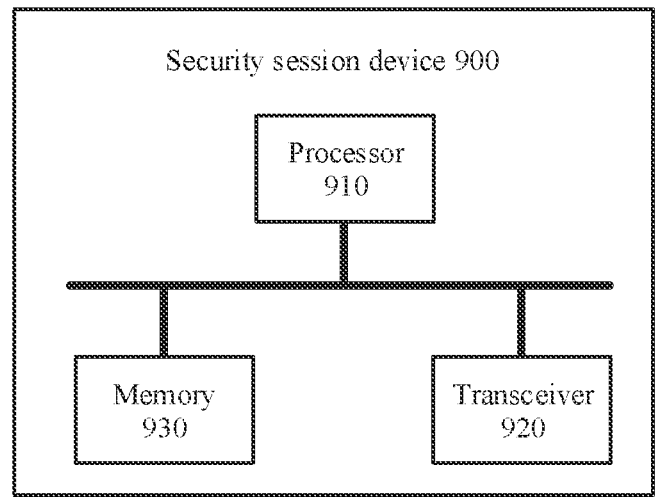
FIG. 10 is a schematic block diagram of a secure session device according to an embodiment of this application.

It should be understood that the transceiver unit 810 in the secure session apparatus 800 may correspond to a transceiver 920 in a secure session device 900 shown in FIG. 10, and the processing unit 820 in the secure session apparatus 800 may correspond to a transceiver 920 in the secure session device 900 shown in FIG. 10.

FIG. 10 is a schematic block diagram of a secure session device 900 according to an embodiment of this application. As shown in the figure, the secure session device 900 includes a processor 910 and a transceiver 920. The processor 910 is coupled to a memory, and is configured to execute an instruction stored in the memory, to control the transceiver 920 to send a signal and/or receive a signal. Optionally, the secure session device 900 further includes the memory 930, configured to store the instruction.

It should be understood that the processor 910 and the memory 930 may be combined into one processing apparatus, and the processor 910 is configured to execute program code stored in the memory 930 to implement the foregoing functions. During specific implementation, the memory 930 may alternatively be integrated into the processor 910, or may be independent of the processor 910.

It should be further understood that the transceiver 920 may include a receiver (or referred to as a receiving machine) and a transmitter (or referred to as a transmitting machine). The transceiver 920 may further include an antenna, and there may be one or more antennas.

In a possible design, the secure session device 900 may be the user plane gateway in the foregoing method embodiments, or may be a chip configured to implement functions of the user plane gateway in the foregoing method embodiments.

Specifically, the secure session device 900 may correspond to the user plane gateway in the methods 200 to 700 according to the embodiments of this application. The secure session device 900 may include units configured to perform the methods performed by the user plane gateway in the method 200 in FIG. 3 to the method 700 in FIG. 8A and FIG. 8B. In addition, the units in the secure session device 900 and the foregoing other operations and/or functions are separately used to implement a corresponding procedure of the method 200 in FIG. 3, the method 300 in FIG. 4A and FIG. 4B, the method 400 in FIG. 5, the method 500 in FIG. 6A and FIG. 6B, the method 600 in FIG. 7, or the method 700 in FIG. 8A and FIG. 8B. It should be understood that a specific process in which each unit performs the foregoing corresponding steps is described in detail in the foregoing method embodiments. For brevity, details are not described herein again.

In another possible design, the secure session device 900 may be the session management network element in the foregoing method embodiments, or may be a chip configured to implement functions of the session management network element in the foregoing method embodiments.

Specifically, the secure session device 900 may correspond to the session management network element in the methods 200 to 700 according to the embodiments of this application. The secure session device 900 may include units configured to perform the methods performed by the session management network element in the method 200 in FIG. 3 to the method 700 in FIG. 8A and FIG. 8B. In addition, the units in the secure session device 900 and the foregoing other operations and/or functions are separately used to implement a corresponding procedure of the method 200 in FIG. 3, the method 300 in FIG. 4A and FIG. 4B, the method 400 in FIG. 5, the method 500 in FIG. 6A and FIG. 6B, the method 600 in FIG. 7, or the method 700 in FIG. 8A and FIG. 8B. It should be understood that a specific process in which each unit performs the foregoing corresponding steps is described in detail in the foregoing method embodiments. For brevity, details are not described herein again.

In another possible design, the secure session device 900 may be the access and mobility management network element in the foregoing method embodiments, or may be a chip configured to implement functions of the access and mobility management network element in the foregoing method embodiments.

Specifically, the secure session device 900 may correspond to the access and mobility management network element in the methods 200 to 700 according to the embodiments of this application. The secure session device 900 may include units configured to perform the methods performed by the access and mobility management network element in the method 200 in FIG. 3 to the method 700 in FIG. 8A and FIG. 8B. In addition, the units in the secure session device 900 and the foregoing other operations and/or functions are separately used to implement a corresponding procedure of the method 200 in FIG. 3, the method 300 in FIG. 4A and FIG. 4B, the method 400 in FIG. 5, the method 500 in FIG. 6A and FIG. 6B, the method 600 in FIG. 7, or the method 700 in FIG. 8A and FIG. 8B. It should be understood that a specific process in which each unit performs the foregoing corresponding steps is described in detail in the foregoing method embodiments. For brevity, details are not described herein again.

In another possible design, the secure session device 900 may be the UE in the foregoing method embodiments, or may be a chip configured to implement functions of the UE in the foregoing method embodiments.

Specifically, the secure session device 900 may correspond to the UE in the methods 200 to 700 according to the embodiments of this application. The secure session device 900 may include units configured to perform the methods performed by the UE in the method 200 in FIG. 3 to the method 700 in FIG. 8A and FIG. 8B. In addition, the units in the secure session device 900 and the foregoing other operations and/or functions are separately used to implement a corresponding procedure of the method 200 in FIG. 3, the method 300 in FIG. 4A and FIG. 4B, the method 400 in FIG. 5, the method 500 in FIG. 6A and FIG. 6B, the method 600 in FIG. 7, or the method 700 in FIG. 8A and FIG. 8B.

It should be understood that a specific process in which each unit performs the foregoing corresponding steps is described in detail in the foregoing method embodiments. For brevity, details are not described herein again.

According to the methods provided in the embodiments of this application, this application further provides a computer program product. The computer program product includes computer program code. When the computer program code is run on a computer, the computer is enabled to perform the secure session method in any one of the embodiments shown in FIG. 3 to FIG. 8A and FIG. 8B.

According to the methods provided in the embodiments of this application, this application further provides a computer-readable medium. The computer-readable medium stores program code. When the program code is run on a computer, the computer is enabled to perform the secure session method in any one of the embodiments shown in FIG. 3 to FIG. 8A and FIG. 8B.

According to the methods provided in the embodiments of this application, this application further provides a system, including the user plane gateway, the session management network element, the access and mobility management network element, the access network device, and the UE described above.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general purpose computer, a special purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network elements in the foregoing apparatus embodiments may completely correspond to the network elements in the method embodiments, and a corresponding module or unit performs a corresponding step. For example, a transceiver unit (a transceiver) performs a receiving step or a sending step in the method embodiments, and a processing unit (a processor) may perform steps other than the sending step and the receiving step. For a function of a specific unit, refer to a corresponding method embodiment. There may be one or more processors.

In this application, "at least one" means one or more, and "a plurality of" means two or more. The term "and/or" describes an association relationship between associated objects and indicates that three relationships may exist. For example, A and/or B may indicate the following cases. Only A exists, both A and B exist, and only B exists, where A and B may be singular or plural. The character "/" generally represents an "or" relationship between the associated objects, and "at least one item (piece) of the following" or a similar expression thereof means any combination of these items, including a singular item (piece) or any combination of plural items (pieces). For example, at least one of a, b, or c may indicate a, b, c, a and b, a and c, b and c, or a, b, and c, where a, b, and c may be singular or plural.

It should be understood that "one embodiment" or "an embodiment" mentioned in the entire specification means that particular features, structures, or characteristics related to the embodiment are included in at least one embodiment of this application. Therefore, "in one embodiment" or "in an embodiment" that appears throughout the entire specification does not necessarily mean a same embodiment. In addition, these particular features, structures, or characteristics may be combined in one or more embodiments in any proper manner. It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of the present invention.

Terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As shown in figures, both a computing device and an application that runs on the computing device may be components. One or more components may reside in a process and/or an execution thread, and a component may be located on one computer and/or distributed between two or more computers. In addition, these components may be executed by various computer-readable media that store various data structures. For example, the components may communicate by using a local and/or remote process based on a signal having one or more data packets (for example, data from two components interacting with another component in a local system, a distributed system, and/or across a network such as the internet interacting with another system by using the signal).

A person of ordinary skill in the art may be aware that illustrative logical blocks and steps (step) described with reference to the embodiments disclosed in this specification may be implemented by electronic hardware or a combination of computer software and electronic hardware. Whether the functions are performed by hardware or software depends on a particular application and a design constraint of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit.

In the foregoing embodiments, all or some of the functions of the functional units may be implemented by using software, hardware, firmware, or any combination thereof. When the software is used to implement the embodiments, all or some of the embodiments may be implemented in a form of a computer program product. The computer program product includes one or more computer instructions (programs). When the computer program instructions (programs) are loaded and executed on a computer, the procedures or functions according to the embodiments of this application are all or partially generated. The computer may be a general purpose computer, a special purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for indicating a computer device (which may be a personal computer, a server, or a network device) to perform all or some of the steps of the methods described in the embodiments of this application. The foregoing storage medium includes any medium that can store program code, for example, a USB flash drive, a removable hard disk, a read-only memory (ROM), a random-access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A secure session method, comprising:
sending, by user equipment (UE), a service request message, wherein the service request message comprises a request to establish a connection between the UE and a service server in a data network;
generating, by the UE, an encryption key and an integrity protection key;
activating, by the UE, at least one of encryption protection or integrity protection based on the encryption key and the integrity protection key; and
receiving, by the UE, a key identifier, wherein the key identifier comprises a key set identifier in 5G (ngKSI) corresponding to an intermediate key, and wherein the intermediate key is a key used to generate a user plane function (UPF) transmission root key, and wherein an one-to-one correspondence between the intermediate key and the ngKSI is stored at the UE prior to receiving the key identifier.

2. The method according to claim 1, wherein the method further comprises:
receiving, by the UE, indication information of a first security algorithm, wherein the first security algorithm is determined based on a security capability of the UE, a security capability of a user plane gateway, and a security requirement of a service.

3. The method according to claim 1, wherein the method further comprises:
receiving, by the UE, second security activation indication information from an access network device, wherein the second security activation indication information indicates to activate user plane security protection between the UE and a user plane gateway, but not to activate user plane security protection between the UE and the access network device.

4. A secure session apparatus, comprising:
at least one processor; and
one or more memories coupled to the at least one processor and storing programming instructions for execution by the at least one processor, the programming instructions instruct the at least one processor to:
send a service request message, wherein the service request message comprises a request to establish a connection between the secure session apparatus and a service server in a data network;
generate an encryption key and an integrity protection key;
activate at least one of encryption protection or integrity protection based on the encryption key and the integrity protection key; and
receive a key identifier, wherein the key identifier comprises a key set identifier in 5G (ngKSI) corresponding to an intermediate key, and wherein the intermediate key is a key used to generate a user plane function (UPF) transmission root key, and wherein an one-to-one correspondence between the intermediate key and the ngKSI is stored at the apparatus prior to receiving the key identifier.

5. The secure session apparatus according to claim 4, wherein the programming instructions further instruct the at least one processor to:
receive indication information of a first security algorithm, wherein the first security algorithm is determined based on a security capability of user equipment (UE), a security capability of a user plane gateway, and a security requirement of a service.

6. The secure session apparatus according to claim 4, wherein the programming instructions further instruct the at least one processor to:
receive second security activation indication information from an access network device, wherein the second security activation indication information indicates to activate user plane security protection of UE.

7. A secure session apparatus, comprising:
at least one processor; and
one or more memories coupled to the at least one processor and storing programming instructions for execution by the at least one processor, the programming instructions instruct the at least one processor to:
receive a service request message from user equipment (UE), wherein the service request message comprises a request to establish a connection between the UE and a service server in a data network;
generate an encryption key and an integrity protection key based on the service request message;
receive a key identifier, wherein the key identifier comprises a key set identifier in 5G (ngKSI) corresponding to an intermediate key, and wherein the intermediate key is a key used to generate a user plane function (UPF) transmission root key, and wherein an one-to-one correspondence between the intermediate key and the ngKSI is stored at the UE prior to receiving the key identifier; and
activate at least one of encryption protection or integrity protection based on the encryption key and the integrity protection key.

8. The secure session apparatus according to claim 7, wherein the programming instructions further instruct the at least one processor to:
determine a first security algorithm based on a security capability of the UE, a security capability of a user plane gateway, and a security requirement of a service; and
send indication information of the first security algorithm to the UE.

9. The secure session apparatus according to claim 7, wherein the programming instructions further instruct the at least one processor to:
receive indication information of a first security algorithm from a session management network element, wherein the first security algorithm is determined based on a security capability of the UE, a security capability of a user plane gateway, and a security requirement of a service.

10. The secure session apparatus according to claim 7, wherein the programming instructions further instruct the at least one processor to:
send first security activation indication information to an access network device, wherein the first security activation indication information indicates not to activate user plane security protection of the access network device.

11. A secure session method, comprising:
receiving a service request message from user equipment (UE), wherein the service request message comprises a request to establish a connection between the UE and a service server in a data network;
generating an encryption key and an integrity protection key based on the service request message;
receiving a key identifier, wherein the key identifier comprises a key set identifier in 5G (ngKSI) corresponding to an intermediate key, and wherein the intermediate key is a key used to generate a user plane function (UPF) transmission root key, and wherein an one-to-one correspondence between the intermediate key and the ngKSI is stored at the UE prior to receiving the key identifier; and activating at least one of encryption protection or integrity protection based on the encryption key and the integrity protection key.

12. The secure session method according to claim 11, wherein the method further comprises:

determining a first security algorithm based on a security capability of the UE, a security capability of a user plane gateway, and a security requirement of a service; and sending indication information of the first security algorithm to the UE.

13. The secure session method according to claim 11, wherein the method further comprises:

receiving indication information of a first security algorithm from a session management network element, wherein the first security algorithm is determined based on a security capability of the UE, a security capability of a user plane gateway, and a security requirement of a service.

14. The secure session method according to claim 11, wherein the method further comprises:

sending first security activation indication information to an access network device, wherein the first security activation indication information indicates not to activate user plane security protection of the access network device.

* * * * *